(12) United States Patent
Zurmoehle et al.

(10) Patent No.: US 12,236,550 B2
(45) Date of Patent: Feb. 25, 2025

(54) OBJECT CREATION WITH PHYSICAL MANIPULATION

(71) Applicant: MAGIC LEAP, INC., Plantation, FL (US)

(72) Inventors: Tim Zurmoehle, Plantation, FL (US); Andrea Isabel Montoya, Plantation, FL (US); Robert John Cummings Macdonald, Plantation, FL (US); Sakina Groth, Plantation, FL (US); Genevieve Mak, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/182,590

(22) Filed: Mar. 13, 2023

(65) Prior Publication Data
US 2023/0267697 A1    Aug. 24, 2023

Related U.S. Application Data

(63) Continuation of application No. 17/368,495, filed on Jul. 6, 2021, now Pat. No. 11,636,660, which is a
(Continued)

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/011* (2013.01); *G06F 3/016* (2013.01); *G06F 3/017* (2013.01);
(Continued)

(58) Field of Classification Search
CPC ... G06T 19/20; G06T 19/006; G06T 2200/24; G06T 2219/2004; G06F 3/011; G06F 3/016; G06F 3/017; G06F 3/0346
(Continued)

(56) References Cited

U.S. PATENT DOCUMENTS

| 5,923,318 A | 7/1999 | Zhai et al. |
| 6,629,065 B1 | 9/2003 | Gadh et al. |

(Continued)

FOREIGN PATENT DOCUMENTS

| AU | 2018261328 B2 | 8/2022 |
| AU | 2022271460 B2 | 12/2022 |

(Continued)

OTHER PUBLICATIONS

Foreign Response for CN Patent Appln. No. 202080026322.7 dated Jun. 26, 2023.
(Continued)

*Primary Examiner* — Javid A Amini
(74) *Attorney, Agent, or Firm* — Vista IP Law Group, LLP

(57) ABSTRACT

Described are improved systems and methods for navigation and manipulation of interactable objects in a 3D mixed reality environment. Improved systems and methods are provided to implement physical manipulation for creation and placement of interactable objects, such as browser windows and wall hangings. A method includes receiving data indicating a selection of an interactable object contained within a first prism at the start of a user interaction. The method also includes receiving data indicating an end of the user interaction with the interactable object. The method further includes receiving data indicating a physical movement of the user corresponding to removing the interactable object from the first prism between the start and the end of the user interaction. Moreover, the method includes creating a second prism to contain the data associated with the interactable object at the end of the user interaction with the interactable object.

20 Claims, 25 Drawing Sheets

Related U.S. Application Data continuation of application No. 16/971,603, filed as application No. PCT/US2019/018920 on Feb. 21, 2019, now Pat. No. 11,087,563.

(60) Provisional application No. 62/665,251, filed on May 1, 2018, provisional application No. 62/634,007, filed on Feb. 22, 2018.

(51) Int. Cl.
    *G06F 3/0346* (2013.01)
    *G06T 19/00* (2011.01)

(52) U.S. Cl.
    CPC .......... *G06F 3/0346* (2013.01); *G06T 19/006* (2013.01); *G06T 2200/24* (2013.01); *G06T 2219/2004* (2013.01)

(58) Field of Classification Search
    USPC ........................................ 345/419
    See application file for complete search history.

(56) References Cited

U.S. PATENT DOCUMENTS

| | | | |
|---|---|---|---|
| 6,720,949 B1 | 4/2004 | Pryor et al. | |
| 8,912,979 B1 | 12/2014 | Gomez | |
| 8,924,862 B1 | 12/2014 | Luo | |
| 9,411,422 B1 | 8/2016 | McClendon et al. | |
| 9,671,566 B2 | 6/2017 | Abovitz et al. | |
| 9,734,633 B2 | 8/2017 | Bennett et al. | |
| 9,761,055 B2 | 9/2017 | Miller | |
| 10,803,663 B2 | 10/2020 | Wang et al. | |
| 2002/0033845 A1 | 3/2002 | Elber et al. | |
| 2006/0193510 A1 | 8/2006 | Matsumoto et al. | |
| 2007/0226647 A1 | 9/2007 | Louch | |
| 2008/0115081 A1 | 5/2008 | Sankaravadivelu et al. | |
| 2009/0089364 A1 | 4/2009 | Hamilton, II et al. | |
| 2012/0030617 A1 | 2/2012 | Louch | |
| 2012/0131496 A1 | 5/2012 | Goossens et al. | |
| 2012/0179426 A1 | 7/2012 | Fontes et al. | |
| 2012/0212484 A1 | 8/2012 | Haddick et al. | |
| 2012/0249741 A1 | 10/2012 | Maciocci et al. | |
| 2012/0266101 A1 | 10/2012 | Shah | |
| 2012/0294539 A1 | 11/2012 | Lim et al. | |
| 2013/0278631 A1* | 10/2013 | Border ................. G06F 3/04842 345/633 |
| 2013/0342572 A1 | 12/2013 | Poulos et al. | |
| 2014/0002444 A1 | 1/2014 | Bennett et al. | |
| 2014/0118397 A1 | 5/2014 | Lee et al. | |
| 2014/0168262 A1 | 6/2014 | Forutanpour et al. | |
| 2014/0184496 A1 | 7/2014 | Gribetz et al. | |
| 2014/0195988 A1 | 7/2014 | Kramer et al. | |
| 2014/0200863 A1 | 7/2014 | Kamat et al. | |
| 2014/0225922 A1 | 8/2014 | Sbardella | |
| 2014/0232639 A1 | 8/2014 | Hayashi et al. | |
| 2014/0237393 A1 | 8/2014 | Van Wie et al. | |
| 2014/0248950 A1 | 9/2014 | Tosas Bautista | |
| 2014/0267228 A1 | 9/2014 | Ofek et al. | |
| 2014/0282274 A1 | 9/2014 | Everitt et al. | |
| 2014/0306866 A1 | 10/2014 | Miller et al. | |
| 2014/0337792 A1* | 11/2014 | Phang ................. G06F 3/0485 715/850 |
| 2014/0375683 A1 | 12/2014 | Salter et al. | |
| 2015/0143302 A1* | 5/2015 | Chang ................. G06F 16/951 715/849 |
| 2015/0163345 A1 | 6/2015 | Cornaby et al. | |
| 2015/0185825 A1 | 7/2015 | Mullins | |
| 2015/0206343 A1 | 7/2015 | Mattila et al. | |
| 2015/0206349 A1 | 7/2015 | Rosenthal et al. | |
| 2015/0253862 A1 | 9/2015 | Seo et al. | |
| 2015/0268831 A1* | 9/2015 | Sripada ................. G06F 3/0488 715/849 |
| 2015/0277699 A1 | 10/2015 | Algreatly | |
| 2015/0302651 A1 | 10/2015 | Shpigelman | |
| 2015/0317831 A1 | 11/2015 | Ebstyne et al. | |
| 2015/0331240 A1 | 11/2015 | Poulos et al. | |
| 2015/0332509 A1 | 11/2015 | Jovanovic | |
| 2016/0026253 A1 | 1/2016 | Bradski et al. | |
| 2016/0027214 A1 | 1/2016 | Memmott et al. | |
| 2016/0048204 A1 | 2/2016 | Scott et al. | |
| 2016/0077677 A1 | 3/2016 | Valdes | |
| 2016/0180602 A1 | 6/2016 | Fuchs | |
| 2016/0210602 A1 | 7/2016 | Siddique et al. | |
| 2016/0266386 A1 | 9/2016 | Scott et al. | |
| 2016/0300392 A1 | 10/2016 | Jonczyk et al. | |
| 2016/0321378 A1 | 11/2016 | Kagan et al. | |
| 2017/0011557 A1 | 1/2017 | Lee et al. | |
| 2017/0046881 A1 | 2/2017 | Kuribara | |
| 2017/0052994 A1 | 2/2017 | Jain et al. | |
| 2017/0054569 A1 | 2/2017 | Harms et al. | |
| 2017/0060514 A1 | 3/2017 | Kaufthal | |
| 2017/0109936 A1 | 4/2017 | Powderly et al. | |
| 2017/0132835 A1 | 5/2017 | Halliday et al. | |
| 2017/0235848 A1 | 8/2017 | Van Dusen et al. | |
| 2017/0256096 A1* | 9/2017 | Faaborg ................. G06T 19/003 |
| 2017/0256099 A1 | 9/2017 | Li | |
| 2017/0258526 A1 | 9/2017 | Lang | |
| 2017/0287218 A1 | 10/2017 | Nuernberger et al. | |
| 2017/0322622 A1 | 11/2017 | Hong et al. | |
| 2018/0004283 A1 | 1/2018 | Mathey-Owens et al. | |
| 2018/0005034 A1 | 1/2018 | Kaehler et al. | |
| 2018/0012330 A1 | 1/2018 | Holzer et al. | |
| 2018/0033204 A1 | 2/2018 | Dimitrov et al. | |
| 2018/0045963 A1 | 2/2018 | Hoover et al. | |
| 2018/0082480 A1 | 3/2018 | White et al. | |
| 2018/0095276 A1 | 4/2018 | Ng-Thow-Hing | |
| 2018/0101994 A1 | 4/2018 | Da Veiga et al. | |
| 2018/0131788 A1* | 5/2018 | Roberts ................. H04L 67/131 |
| 2018/0144111 A1 | 5/2018 | Katingari | |
| 2018/0144556 A1* | 5/2018 | Champion ................. G06F 3/04815 |
| 2018/0150204 A1 | 5/2018 | Macgillivray | |
| 2018/0210206 A1 | 7/2018 | Eronen et al. | |
| 2018/0225885 A1 | 8/2018 | Dishno | |
| 2018/0349485 A1 | 12/2018 | Carlisle et al. | |
| 2018/0365897 A1 | 12/2018 | Pahud et al. | |
| 2018/0374143 A1 | 12/2018 | Williamson et al. | |
| 2019/0005724 A1 | 1/2019 | Pahud et al. | |
| 2019/0025999 A1 | 1/2019 | Murphy et al. | |
| 2019/0043259 A1 | 2/2019 | Wang et al. | |
| 2019/0079648 A1 | 3/2019 | Karunamuni et al. | |
| 2019/0156585 A1 | 5/2019 | Mott et al. | |
| 2019/0197785 A1 | 6/2019 | Tate-Gans et al. | |
| 2021/0097775 A1* | 4/2021 | Zurmoehle ................. G06F 3/0346 |

FOREIGN PATENT DOCUMENTS

| | | |
|---|---|---|
| CN | 103460256 | 12/2013 |
| CN | 105229719 | 1/2016 |
| EP | 1556805 | 8/2011 |
| EP | 2455858 | 5/2012 |
| JP | 2007-58332 | 3/2007 |
| JP | 2009-518699 | 5/2009 |
| JP | 2010-534974 | 11/2010 |
| JP | 2014-515962 | 7/2014 |
| JP | 2015-504616 | 2/2015 |
| JP | 2016-500891 | 1/2016 |
| JP | 2016-508257 | 3/2016 |
| JP | 2016-511492 | 4/2016 |
| KR | 10-2008-0047575 | 5/2008 |
| KR | 10-2013-0137692 | 12/2013 |
| KR | 10-2014-0071086 | 6/2014 |
| KR | 10-2015-0130495 | 11/2015 |
| KR | 10-2017-0018930 | 2/2017 |
| WO | WO 2007/038090 | 4/2007 |
| WO | WO 2015/033377 | 3/2015 |
| WO | WO 2016/203792 | 12/2016 |

(56) References Cited

FOREIGN PATENT DOCUMENTS

| WO | WO 2017/040442 | 3/2017 |
|---|---|---|
| WO | WO 2017/062289 | 4/2017 |

OTHER PUBLICATIONS

Final Office Action for U.S. Appl. No. 17/316,925 dated Aug. 14, 2023.
Foreign OA for JP Patent Appln. No. 2021-559089 dated Aug. 10, 2023 (with English translation).
Foreign OA for JP Patent Appln. No. 2022-142067 dated Aug. 7, 2023 (with English translation).
Notice of Allowance for U.S. Appl. No. 17/663,792 dated Aug. 30, 2023.
Foreign OA for JP Patent Appln. No. 2022-117087 dated Aug. 14, 2023 (with English translation).
Foreign Response for CA Patent Appln. No. 3060209 dated Oct. 26, 2023.
Foreign Response for AU Patent Appln. No. 2022271460 dated Oct. 26, 2023.
Foreign Response for JP Patent Appln. No. 2021-559089 dated Oct. 30, 2023.
Foreign Response for JP Patent Appln. No. 2022-142067 dated Oct. 31, 2023.
Foreign OA for KR Patent Appln. No. 10-2023-7023782 dated Nov. 7, 2023.
Response After Final for U.S. Appl. No. 17/316,925 dated Nov. 14, 2023.
Foreign NOA for KR Patent Appln. No. 10-2022-7027516 dated Apr. 10, 2023.
Foreign NOA for KR Patent Appln. No. 10-2020-7021106 dated Apr. 18, 2023.
Amendment Response to NFOA for U.S. Appl. No. 17/316,925 dated May 16, 2023.
Notice of Allowance for U.S. Appl. No. 17/241,977 dated May 12, 2023.
Final Office Action for U.S. Appl. No. 17/663,792 dated May 24, 2023.
Foreign Exam Report for NZ Patent Appln. No. 758288 dated May 12, 2023.
Foreign OA for JP Patent Appln. No. 2022-117087 dated Jan. 26, 2024 (with English translation).
Foreign OA for JP Patent Appln. No. 2022-142067 dated Jan. 25, 2024 (with English translation).
Foreign Response for CN Patent Appln. No. 201880088453.0 dated Feb. 28, 2024.
Foreign NOA for CA Patent Appln. No. 3060209 dated Feb. 1, 2024.
Foreign Response for JP Patent Appln. No. 2022-199311 dated Mar. 13, 2024.
Foreign Response for KR Patent Appln. No. 10-2023-7023782 dated Dec. 28, 2023.
Foreign Decision of Rejection for CN Patent Appln. No. 202080026322.7 dated Mar. 18, 2023.
Foreign NOA for JP Patent Appln. No. 2022-143449 dated Apr. 4, 2023.
Amendment After Final for U.S. Appl. No. 17/241,977 dated Apr. 12, 2023.
Foreign Response for JP Patent Appln. No. 2022-117087 dated Nov. 17, 2023.
Foreign NOA for AU Patent Appln. No. 2022271460 dated Nov. 7, 2023.
Notice of Allowance for U.S. Appl. No. 17/316,925 dated Dec. 11, 2023.
Non-Final Office Action for U.S. Appl. No. 17/804,394 dated Jan. 11, 2024.
Foreign OA for JP Patent Appln. No. 2022-199311 dated Dec. 21, 2023 (with English translation).
Foreign NOA for JP Patent Appln. No. 2021-559089 dated Jan. 16, 2024.
Foreign Response for EP Patent Appln. No. 23159324.5 dated Jan. 19, 2024.
Foreign OA for CN Patent Appln. No. 201980014588.7 dated Dec. 28, 2023 (with English translation).
Szalavari, Zsolt, Erik Eckstein, and Michael Gervautz. "Collaborative gaming in augmented reality." Proceedings of the ACM symposium on Virtual reality software and technology. 1998. (Year: 1998).
Notice of Allowance for U.S. Appl. No. 15/968,673 dated Jul. 15, 2020.
PCT Notification of the International Search Report and Written Opinion mailed Jul. 11, 2018 for PCT Application No. PCT/US2018/030535, Applicant Magic Leap, Inc., 14 pages.
Extended European Search Report for EP Appln. No. 18794284.2 dated Jan. 29, 2020 (7 pages).
Foreign Response to 70(2) for EP Patent Appln. No. 18794284.2 dated Aug. 28, 2020.
Non-Final Office Action for U.S. Appl. No. 15/968,673 dated Oct. 17, 2019.
Final Office Action for U.S. Appl. No. 15/968,673 dated Mar. 30, 2020.
Amendment Response to Non-Final Office Action for U.S. Appl. No. 15/968,673 dated Jan. 17, 2020.
Amendment Response to Final Office Action for U.S. Appl. No. 15/968,673 dated Jun. 26, 2020.
Non-Final Office Action for U.S. Appl. No. 16/281,540 dated May 4, 2020.
Amendment Response to Non-Final Office Action for U.S. Appl. No. 16/281,540 dated Aug. 4, 2020.
PCT International Search Report and Written Opinion for International Appln. No. PCT/US2019/018932, Applicant Magic Leap, Inc., forms PCT/ISA/210, 220, and 237, dated May 14, 2019.
Non-Final Office Action for U.S. Appl. No. 16/224,719 dated Feb. 6, 2020.
Final Office Action for U.S. Appln. No. 224,719 dated Jun. 18, 2020.
Amendment Response to Non-Final Office Action for U.S. Appl. No. 16/224,719 dated May 6, 2020.
IT Jungles, "iPhone—How to Move Re-arrange Home Screen Icons", Mar. 15, 2015, YouTube.com (Year: 2015).
PCT Invitation to Pay Additional Fees for International Patent Appln. No. PCT/US18/66331, Applicant Magic Leap Inc., form PCT/ISA/206, dated Mar. 13, 2019 (3 pages).
PCT International Search Report and Written Opinion for International Patent Appln. No. PCT/US18/66331, Applicant Magic Leap Inc., forms PCT/ISA/210, 220, and 237, dated May 8, 2019 (11 pages).
Amendment After Final for U.S. Appl. No. 16/224,719 dated Sep. 18, 2020.
Non-Final Office Actino for U.S. Appl. No. 16/224,719 dated Oct. 5, 2020.
Notice of Allowance for U.S. Appl. No. 15/968,673 dated Oct. 7, 2020.
Final Office Action for U.S. Appl. No. 16/281,540 dated Oct. 27, 2020.
Amendment Response to NFOA for U.S. Appl. No. 16/224,719 dated Jan. 5, 2021.
RCE and Response to Final Office Action for U.S. Appl. No. 16/281,540, filed Jan. 27, 2021.
Notice of Allowance for U.S. Appl. No. 16/224,719 dated Jan. 27, 2021.
Notice of Allowance for U.S. Appl. No. 16/281,540 dated Feb. 11, 2021.
Extended European Search Report for EP Appln. No. 18891755.3 dated Dec. 23, 2020 (9 pages).
Dieter Schmalstieg et al: "The Studierstube Augmented Reality Project—TR-186-2-00-22", Technical Reports of the Technical University of Vienna, Dec. 31, 2000 (Dec. 31, 2000), pp. 1-24, XP055270593, Retrieved from the Internet: URL:https://www.cg.tuwien.ac.at/research/publications/2000/Schm-2000-Stb/TR-186-2-00-22Paper.pdf.

(56) References Cited

OTHER PUBLICATIONS

PCT International Search Report and Written Opinion for International Appln. No. PCT/US20/26656, Applicant Magic Leap, Inc., dated Jun. 22, 2020 (13 pages).
Non-Final Office Action for U.S. Appl. No. 16/839,727 dated Feb. 10, 2021.
Amendment Response to NFOA for U.S. Appl. No. 16/839,727 dated May 10, 2021.
Notice of Allowance for U.S. Appl. No. 16/971,603 dated Feb. 18, 2021.
PCT International Search Report and Written Opinion for International Appln. No. PCT/US19/18920, Applicant Magic Leap, Inc., dated May 14, 2019.
Foreign OA for CN Patent Appln. No. 201880043910.4 dated May 31, 2021.
Non-Final Office Action for U.S. Appl. No. 17/142,210 dated Aug. 5, 2021.
Foreign Response for EP Patent Appln. No. 18891755.3 dated Jul. 29, 2021.
Extended European Search Report for EP Patent Appln. No. 19756664.9 dated Mar. 29, 2021.
RCE and Amendment Response to FOA for U.S. Appl. No. 16/839,727, filed Sep. 30, 2021.
Foreign Response for EP Patent Appln. No 19756664.9 dated Oct. 25, 2021.
Foreign Response for EP Patent Appln. No. 19757809.9 dated Oct. 22, 2021.
Foreign Exam Report for AU Patent Appln. No. 2018261328 dated Sep. 6, 2021.
Foreign OA for JP Patent Appln. No. 2019-559343 dated Oct. 6, 2021 (with English translation).
Uchiyama, H., et al., "Method for Displaying Images on Urban Structures by Augmented Reality," IEICE technical report, JP, The Institute of Electronics, Information and Communication Engineers, Mar. 22, 2012, vol. 111 No. 499, 141-146.
Foreign OA for CN Patent Appln. No. 201880043910.4 dated Jan. 5, 2022.
Foreign OA for KR Patent Appln. No. 10-2019-7035273 dated Sep. 16, 2021.
Foreign OA for KR Patent Appln. No. 10-2019-7035273 dated Jan. 18, 2022.
Final Office Action for U.S. Appl. No. 16/839,727 dated Jun. 30, 2021.
Non-Final Office Action for U.S. Appl. No. 16/839,727 dated Nov. 9, 2021.
Amendment Response for U.S. Appl. No. 16/839,727 dated Feb. 7, 2022.
Foreign Exam Report for IN Patent Appln. No. 201947046799 dated Feb. 11, 2022.
Notice of Allowance for U.S. Appl. No. 17/142,210 dated Feb. 18, 2022.
Non-Final Office Action for U.S. Appl. No. 17/368,495 dated Feb. 25, 2022.
Notice of Allowance for U.S. Appl. No. 16/839,727 dated Feb. 28, 2022.
Foreign OA for JP Patent Appln. No. 2020-544237 dated Feb. 21, 2022 (with English translation).
Foreign FOA for JP Patent Appln. No. 2019-559343 dated Mar. 8, 2022 (with English translation).
Foreign OA for IL Patent Appln. No. 270249 dated Jan. 28, 2022.
Foreign Response for CN Patent Appln. No. 201880043910.4 dated Mar. 16, 2022.
Foreign Response for KR Patent Appln. No. 10-2019-7035273 dated Mar. 15, 2022.
Foreign OA for JP Patent Appln. No. 2020-544190 dated Mar. 15, 2022 (with English translation).
Foreign Rejection Decision for CN Patent Appln. No. 201880043910.4 dated Apr. 29, 2022 (with English translation).
Foreign Response for JP Patent Appln. No. 2020-544237 dated May 17, 2022.
Foreign NOA for KR Patent Appln. No. 10-2019-7035273 dated May 9, 2022.
Amendment Response to NFOA for U.S. Appl. No. 17/368,495 dated May 25, 2022.
Foreign OA for JP Patent Appln. No. 2020-534227 dated May 20, 2022.
Foreign Response for IL Patent Appln. No. 270249 dated May 26, 2022.
Foreign Response for EP Patent Appln. No. 18794284.2 dated Jun. 3, 2022.
Foreign Response for JP Patent Appln. No. 2019-559343 dated Jun. 7, 2022.
Foreign Response for JP Patent Appln. No. 2020-544190 dated Jun. 13, 2022.
Foreign NOA for JP Patent Appln. No. 2020-544190 dated Jun. 24, 2022.
Foreign Response for AU Patent Appln. No. 2018261328 dated Jul. 20, 2022.
Final Office Action for U.S. Appl. No. 17/368,495 dated Jul. 27, 2022.
Foreign Exam Report for IN Patent Appln. No. 202047032176 dated Jul. 19, 2022 in English.
Non-Final Office Action for U.S. Appl. No. 17/241,977 dated Aug. 3, 2022.
Wade et al. "A Gaze-Contingent Adaptive Virtual Reality Driving Environment for Intervention in Individuals with Autism Spectrum Disorders", 2016, ACM (Year: 2016).
Extended European Search Report for EP Patent Appln. No. 20784393.9 dated Jun. 20, 2022.
Foreign OA for JP Patent Appln. No. 2020-544237 dated Aug. 4, 2022.
Foreign NOA for JP Patent Appln. No. 2019-559343 dated Aug. 12, 2022.
Foreign Reexamination Decision for CN Patent Appln. No. 201880043910.4 dated Aug. 22, 2022.
Foreign NOA for AU Patent Appln. No. 2018261328 dated Aug. 10, 2022.
Foreign Exam Report for IN Patent Appln. No. 202047029094 dated Aug. 26, 2022 in English.
Amendment After Final for U.S. Appl. No. 17/368,495 dated Sep. 22, 2022.
Foreign OA for CN Patent Appln. No. 201880043910.4 dated Sep. 23, 2022 (with English translation).
Foreign OA for CN Patent Appln. No. 202080026322.7 dated Oct. 12, 2022.
Schmalstieg, D., et al., "The Studierstube Augmented Reality Project," Presence, vol. 11, No. 1, Feb. 2002, 33-54, © 2002 by the Massachusetts Institute of Technology.
Foreign OA for KR Patent Appln. No. 10-2020-7021106 dated Oct. 14, 2022 (with English translation).
Amendment Response to NFOA for U.S. Appl. No. 17/241,977 dated Nov. 2, 2022.
Foreign OA for JP Patent Appln. No. 2022-143449 dated Nov. 1, 2022 (with English translation).
Foreign NOA for JP Patent Appln. No. 2020-534227 dated Nov. 15, 2022.
Foreign Response for CN Patent Appln. No. 201880043910.4 dated Nov. 18, 2022.
Non-Final Office Action for U.S. Appl. No. 17/663,792 dated Nov. 22, 2022.
Foreign OA for KR Patent Appln. No. 10-2022-7027516 dated Dec. 5, 2022.
Foreign Exam Report for AU Patent Appln. No. 2022271460 dated Dec. 7, 2022.
Foreign NOA for IL Patent Appln. No. 275461 dated Nov. 9, 2022 in English.
Foreign Response for KR Patent Appln. No. 10-2020-7021106 dated Dec. 9, 2022.
Notice of Allowance for U.S. Appl. No. 17/368,495 dated Dec. 14, 2022.
Foreign Response for EP Patent Appln. No. 19756664.9 dated Dec. 20, 2022.

(56) References Cited

OTHER PUBLICATIONS

Foreign NOA for IL Patent Appln. No. 270249 dated Dec. 4, 2022 in English.
Foreign NOA for IL Patent Appln. No. 276629 dated Dec. 21, 2022 in English.
Foreign NOA for IL Patent Appln. No. 276621 dated Dec. 21, 2022 in English.
Foreign Response for JP Patent Appln. No. 2022-143449 dated Jan. 24, 2023.
Foreign NOA for CN Patent Appln. No. 201880043910.4 dated Jan. 11, 2023.
Foreign Response for KR Patent Appln. No. 10-2022-7027516 dated Feb. 3, 2023.
Foreign Response for CN Patent Appln. No. 202080026322.7 dated Feb. 9, 2023.
Non-Final Office Action for U.S. Appl. No. 17/316,925 dated Feb. 16, 2023.
Final Office Action for U.S. Appl. No. 17/241,977 dated Feb. 17, 2023.
Amendment Response to NFOA for U.S. Appl. No. 17/663,792 dated Feb. 22, 2023.
Amendment After Final for U.S. Appl. No. 17/663,792 dated Jul. 24, 2023.
Extended European Search Report for EP Patent Appln. No. 23159324.5 dated Jun. 1, 2023.
Foreign Exam Report for CA Patent Appln. No. 3060209 dated Jun. 30, 2023.
Foreign NOA for JP Patent Appln. No. 2022-199311 dated Mar. 21, 2024.
Foreign Exam Report for EP Patent Appln. No. 19756664.9 dated Jan. 29, 2024.
Amendment Response to NFOA for U.S. Appl. No. 17/804,394 dated Apr. 10, 2024.
Foreign NOA for IL Patent Appln. No. 270249 dated Apr. 15, 2024.
Foreign Response for JP Patent Appln. No. 2022-142067 dated Apr. 25, 2024.
Foreign Hearing Notice for IN Patent Appln. No. 201947046799 dated Apr. 26, 2024 in English.
Foreign OA for KR Patent Appln. No. 10-2020-7026917 dated Apr. 19, 2024 (with English translation).
Foreign Response for CN Patent Appln. No. 201980014588.7 dated May 13, 2024.
Foreign NOA for KR Patent Appln. No. 10-2023-7023782 dated May 14, 2024.
Foreign OA for KR Patent Appln. No. 10-2023-7023413 dated May 20, 2024 (with English translation).
Foreign Response for JP Patent Appln. No. 2022-117087 dated May 28, 2024.
Foreign Response for EP Patent Appln. No. 19756664.9 dated May 29, 2024.
Final Office Action for U.S. Appl. No. 17/804,394 dated Jun. 3, 2024.
Foreign Refusal Order for IN Patent Appln. No. 201947046799 dated Jun. 6, 2024 in English.
Foreign NOA for JP Patent Appln. No. 2022-117087 dated Jun. 25, 2024.
Foreign OA for CN Patent Appln. No. 201980014719.1 dated Jun. 24, 2024.
Foreign NOA for JP Patent Appln. No. 2022-142067 dated Jun. 26, 2024.
Foreign NOA for JP Patent Appln No. 2023-76383 dated Jun. 12, 2024 (with English translation).
Non-Final Office Action for U.S. Appl. No. 18/523,763 dated Aug. 15, 2024.
Amendment After Final for U.S. Appl. No. 17/804,394 dated Aug. 5, 2024.
Notice of Allowance for U.S. Appl. No. 17/804,394 dated Aug. 28, 2024.
Foreign OA for CN Patent Appln. No. 201880088453.0 dated Jun. 28, 2024.
Foreign OA Response for KR Patent Appln. No. 10-2023-7023413 dated Jul. 22, 2024 (with English translation).
Foreign OA for KR Patent Appln. No. 10-2020-7026920 dated Jul. 28, 2024.
Foreign NOA for KR Patent Appln. No. 10-2023-7023413 dated Aug. 21, 2024.
Foreign Response for JP Patent Appln. No. 2023-76383 dated Aug. 27, 2024.
Foreign OA for CN Patent Appln. No. 201980014588.7 dated Aug. 15, 2024 (with English translation).
Notice of Allowance for U.S. Appl. No. 17/804,394 dated Sep. 20, 2024.
Foreign Response for KR Patent Appln. No. 10-2020-7026920 dated Sep. 20, 2024.
Amendment Response to NFOA for U.S. Appl. No. 18/523.763 dated Nov. 12, 2024.
Foreign Response for CN Patent Appln. No. 201980014588.7 dated Oct. 11, 2024.
Foreign Response for CN Patent Appln. No. 201880088453.0 dated Oct. 12, 2024.
Foreign Response for CN Patent Appln. No. 201980014719.1 dated Oct. 17, 2024.
Foreign OA for JP Patent Appln. No. 2024-21089 dated Oct. 24, 2024 (with English translation).
Foreign NOA for CN Patent Appln. No. 201880088453.0 dated Nov. 6, 2024.
Final Office Action for U.S. Appl. No. 18/523,763 dated Nov. 25, 2024.
Foreign OA for CN Patent Appln. No. 201980014588.7 dated Dec. 6, 2024.
Foreign NOA for KR Patent Appln. No. 10-2020-7026917 dated Dec. 20, 2024.
Foreign Response for CN Patent Appln. No. 201980014588.7 dated Jan. 15, 2025.
Foreign OA for JP Patent Appln. No. 2023-76383 dated Dec. 25, 2024 (with English translation).

\* cited by examiner

| Element ID | Preference | Parent Element ID | Child Element ID | Multiple Entity |
|---|---|---|---|---|
| 220 | Main | 260 | 230 | N |
| 230 | Horizontal | 220 | | Y |
| 240 | Vertical | | | Y |
| 250 | Secondary Tab | | | Y |
| 260 | Main Tab | | 220 | N |
| *** | | | | |

FIG. 5

| Surface ID | W | H | Orientation | Real / Virtual | | Position (center of surface) | ... |
|---|---|---|---|---|---|---|---|
| 182 | 48 | 36 | Vertical | R | Multiple | $(2.5, 2.3, 1.2)_{user}$ | |
| 192 | 24 | 24 | Horizontal | R | Single | $(x, y, z)_{user}$ | |
| 186 | 24 | 36 | Vertical | R | Single | $(1.3, 2.3, 1.3)_{world}$ | |
| 190 | 12 | 12 | Vertical | V | Single | $(x, y, z)_{182}$ | |
| 194 | 16 | 16 | Horizontal | V | Multiple | $(x, y, z)_{frame}$ | |
| *** | | | | | Multiple | | |

| Element ID | Surface ID | * * * |
|---|---|---|
| 220 | 182 | |
| 230 | 192 | |
| 240 | 186 | |
| 250 | 190 | |
| * * * | | |

*FIG. 9*

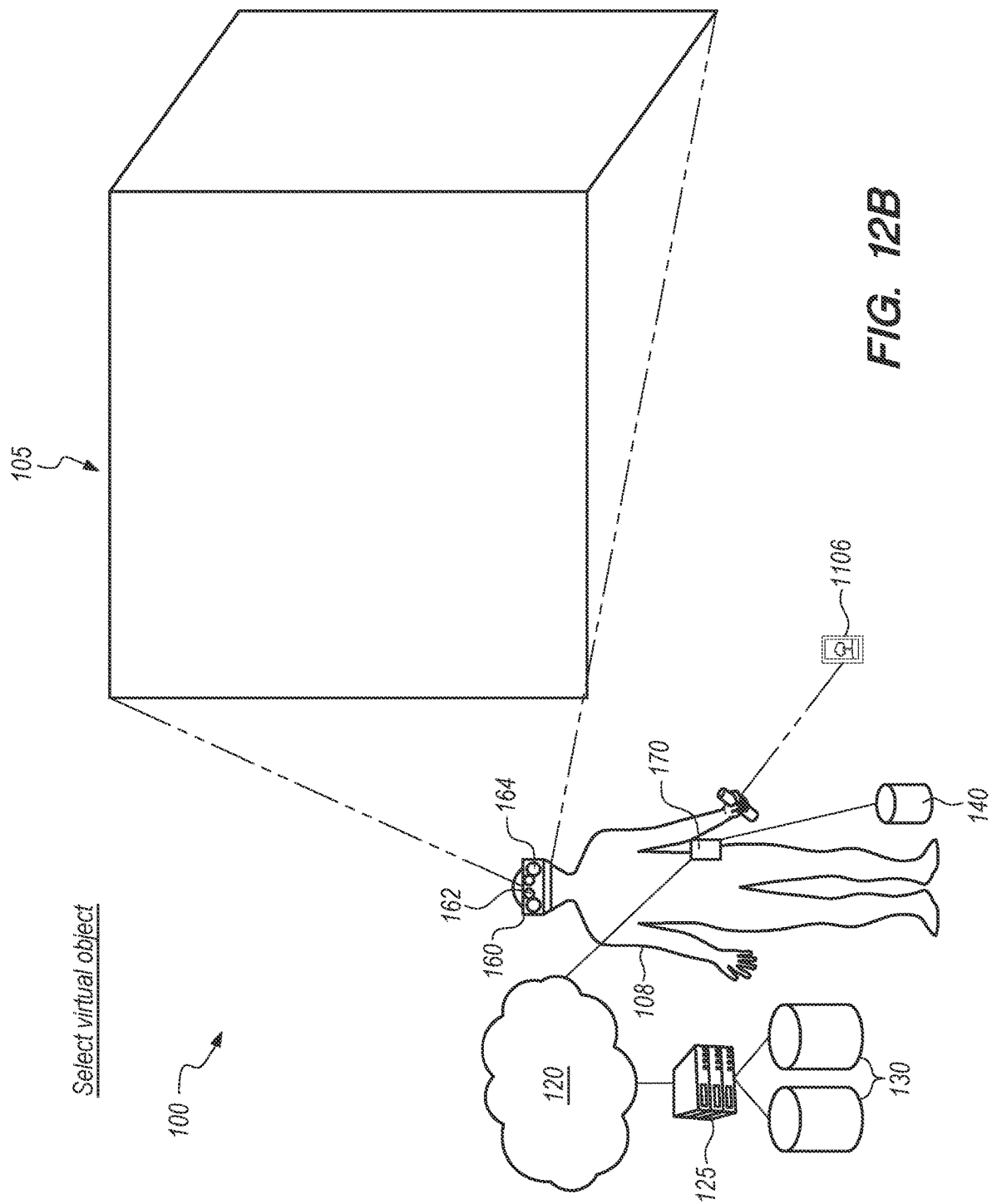

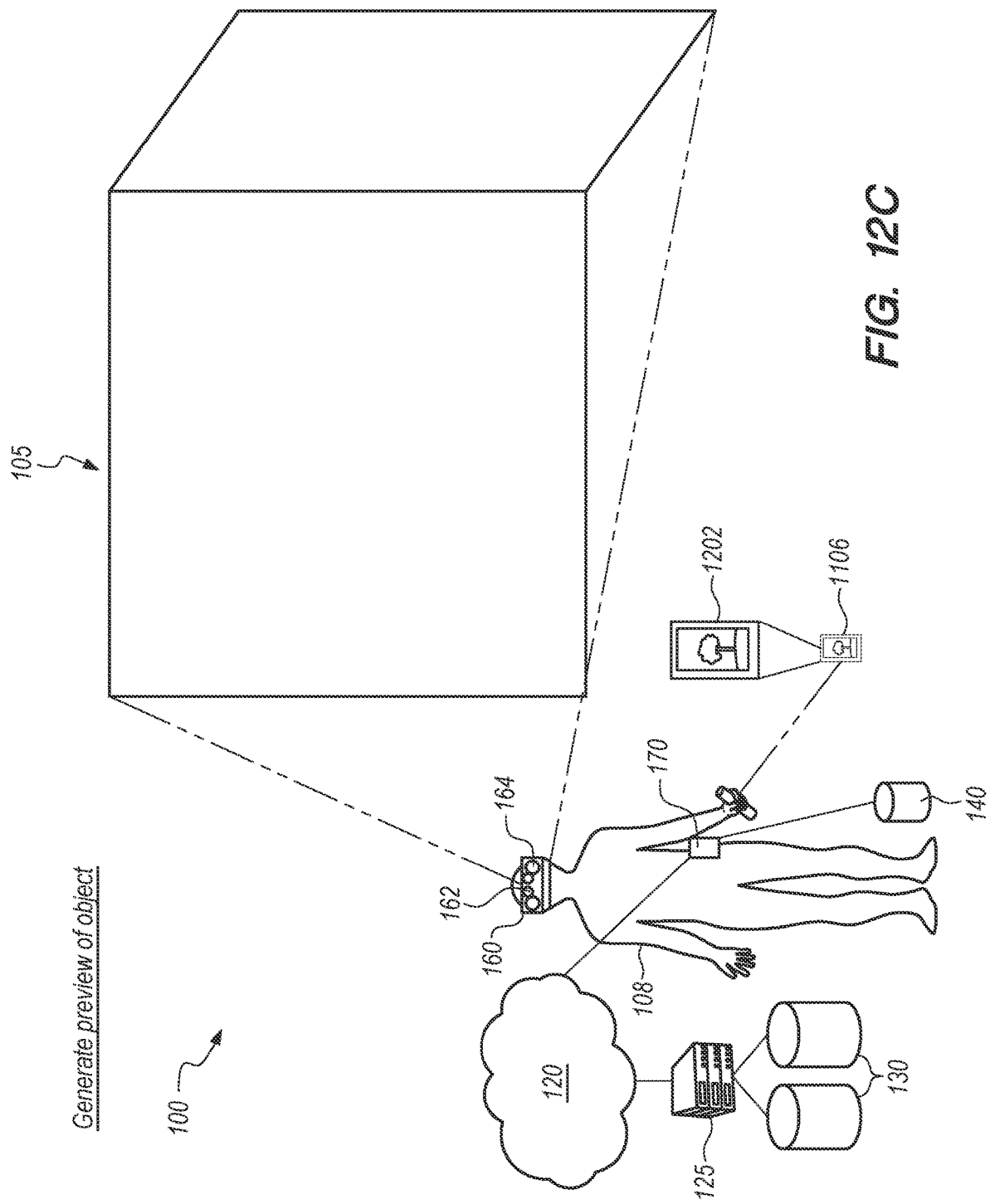

OBJECT CREATION WITH PHYSICAL MANIPULATION

CROSS-REFERENCE TO RELATED U.S. PATENT APPLICATIONS

The present disclosure is a continuation of U.S. patent application Ser. No. 17/368,495, filed on Jul. 6, 2021 and entitled "OBJECT CREATION WITH PHYSICAL MANIPULATION," which is a continuation of U.S. patent application Ser. No. 16/971,603, filed on Aug. 20, 2020 and entitled "OBJECT CREATION WITH PHYSICAL MANIPULATION," which claims priority to PCT Application No. PCT/US2019/018920, filed Feb. 21, 2019 and entitled "OBJECT CREATION WITH PHYSICAL MANIPULATION," which claims priority to U.S. Provisional Application No. 62/634,007, filed on Feb. 22, 2018 and entitled "WINDOW CREATION WITH PHYSICAL MANIPULATION," and U.S. Provisional Application No. 62/665,251, filed on May 1, 2018 and, entitled "OBJECT CREATION WITH PHYSICAL MANIPULATION." The present disclosure is related to U.S. Provisional Application No. 62/492,292, filed on May 1, 2017 and entitled "SPATIALLY DECONSTRUCTED BROWSER." The entire contents of the aforementioned patent applications are hereby explicitly incorporated by reference into the present disclosure for all purposes.

TECHNICAL FIELD

The disclosure relates to systems and methods for implementing browsing technology in a spatial 3D environment.

BACKGROUND OF THE INVENTION

A typical way to view a web page is to open the web page on a monitor of a computer, smartphone, tablet, etc. A user would scroll through the web page to view the different content displayed on the web page. Normally, whether the user is looking at the computer monitor, smartphone or tablet, there is a fixed format as to how the content is displayed on the monitor.

With virtual reality, augmented reality, and/or mixed reality systems (hereinafter collectively referred to as "mixed reality" systems), a three dimensional environment is provided for the display of content to a user. The problem is that conventional approaches to display and manipulate 2D content within browsers do not work very well when used in a 3D environment.

For example, consider the process to create a new window in a computing environment. Typically, a mouse or a similar device is used to manipulate a menu structure to create a window, where the mouse is then used to drag that new window to a desired location. However, with conventional 2D web browsers, since the display area of the display device is limited to the screen area of a monitor that is displaying the content, this means conventional browsers are configured to only know how to create and place within that monitor display area. The conventional window creation approaches are therefore quite limiting when creating new windows in non-2D environments (such as mixed reality systems), since 3D environments are not limited to the strict confines of the monitor display area. As such, conventional 2D browsers perform sub-optimally when used in a 3D environment since conventional browsing technologies just do not have the functionality or capability to take advantage of the 3D environment for creating and displaying content.

This problem also exists for other types of objects in a computing environment, where conventional approaches to interact with computing environments do not contemplate efficient approaches for manipulation of objects in the 3D environment. For example, conventional computing systems just do not provide effective mechanisms to implement placement of newly created objects (such as hanging a digital picture on a wall).

Therefore, there is a need for an improved approach to implement creation and manipulation of objects in a 3D environment.

SUMMARY

Improved systems and methods are provided to implement physical manipulation for creation and placement of interactable objects. In some embodiments, a user of a mixed reality system is provided the ability to place newly created virtual objects (i.e. data associated with interactable object) to any eligible location in the user's environment, where placement of that interactable object is achieved by physical manipulation activities of the user.

Improved systems and methods are provided to implement physical manipulation for creation and placement of browser windows. In some embodiments, a user of a mixed reality system is provided the ability to place the browser window to any eligible location in the user's environment, where placement of that window is achieved by physical manipulation activities of the user. The improved systems and methods for navigation and manipulation of browser windows may be applied in the context of 2D content that is deconstructed and displayed in a spatially organized 3D environment. This may include identifying 2D content, identifying elements in the 2D content, identifying surrounding surfaces, mapping the identified elements to the identified surrounding surfaces, and displaying the elements as virtual content onto the surrounding surfaces.

Some embodiments pertain to improved systems and methods to implement physical manipulation for creation and placement of wall hangings in a single user interaction. In some embodiments, a user of a mixed reality system is provided the ability to place the wall hanging to any eligible location in the user's environment, where placement of that wall hanging is achieved by physical manipulation activities of the user.

Further details of aspects, objects, and advantages of the invention are described below in the detailed description, drawings, and claims. Both the foregoing general description and the following detailed description are exemplary and explanatory, and are not intended to be limiting as to the scope of the invention.

In one embodiment, a method includes receiving data indicating a selection of an interactable object contained within a first prism at the start of a user interaction. The method also includes receiving data indicating an end of the user interaction with the interactable object. The method further includes receiving data indicating a physical movement of the user corresponding to removing the interactable object from the first prism between the start and the end of the user interaction. Moreover, the method includes creating a second prism to contain the data associated with the interactable object at the end of the user interaction with the interactable object.

In one or more embodiments, the method also includes displaying a visual preview of the data associated with the interactable object at a location of the interactable object between the start and the end of the user interaction when the interactable object is located outside the bounds of the first prism. The method may also include a user input device providing the data indicating the selection of the interactable object and the data indicating the end of the user interaction with the interactable object. The user input device may be a haptics controller. The haptics controller may correspond to a totem device having at least six degrees of freedom. A physical movement of the user may be translated into event objects at a processing system associated with the haptics controller, where the event objects correlate to data for movement or positioning of the haptics controller. A location of the interactable object at the end of the user interaction may be determined by identifying a location at which a trigger is released for the haptics controller after the selection of the interactable object. The user input device may be a camera to detect a user gesture. The data indicating the selection of the interactable object may correspond to a selection gesture. The data indicating the end of the user interaction with the interactable object may correspond to a release gesture.

In one or more embodiments, the data indicating the selection of the interactable object corresponds to at least a portion of the user's body interacting with a link. A preview may be generated of the link by accessing content for a URL associated with the link. The method may also include receiving data indicating a physical movement of the user, physical movement of the user corresponds to a physical movement of the preview. The interactable object may be both opened and placed with the user interaction. An orientation for the interactable object may be determined by determining a surface normal of the location of the interactable object at the end of the user interaction, determining the orientation of the data associated with the interactable object, and aligning the surface normal of the coordinate location with the orientation of the data associated with the interactable object. The interactable object may include a wall hanging.

In another embodiment, a method includes identifying an interactable object. The method also includes identifying a physical movement of a user corresponding to the interactable object. The method further includes determining a coordinate location for a data associated with the interactable object based upon the physical movement of the user. Moreover, the method includes placing the data associated with the interactable object at the coordinate location corresponding to the physical movement of the user.

In one or more embodiments, a user input device is employed to detect the physical movement of the user. The user input device may be a haptics controller. The haptics controller may correspond to a totem device having at least six degrees of freedom. The physical movement of the user may be translated into event objects at a processing system associated with the haptics controller, where the event objects correlate to data indicating movement or positioning of the haptics controller. The coordinate location for the interactable object may be determined by identifying a location at which a trigger is released for the haptics controller after the physical movement of the user.

In one or more embodiments, the user input device is a camera to detect a user gesture. The interactable object to open may be identified by identifying a link that interacts with a portion of the user's body. A preview may be generated of the link by accessing content for a URL associated with the link. The physical movement of the user may correspond to a physical movement of the preview. The interactable object may be both opened and placed with a single user interaction of a computing device. An orientation for the interactable object may be determined by determining a surface normal of the coordinate location, determining the orientation of the data associated with the interactable object, and aligning the surface normal of the coordinate location with the orientation of the data associated with the interactable object. The interactable object may include a wall hanging.

In still another embodiment, a system includes a mixed reality display device that is configured to display three dimensional content. The system also includes a user input device configured to detect physical movement of a user. The system further includes a processor that receives and processes data from the user input device, a memory for holding programmable code executable by the processor. The programmable code includes instructions for identifying an interactable object, identifying a physical movement of a user corresponding to the interactable object, determining a coordinate location for a data associated with the interactable object based upon the physical movement of the user, and placing the data associated with the interactable object at the coordinate location corresponding to the physical movement of the user.

In one or more embodiments, the user input device is a haptics controller. The haptics controller may correspond to a totem device having at least six degrees of freedom. The physical movement of the user may be translated into event objects at the processor, where the event objects correlate to the data indicating movement or positioning of the haptics controller. The coordinate location for the interactable object may be determined by identifying a location at which a trigger is released for the haptics controller after the physical movement of the user.

In one or more embodiments, the user input device is a camera to detect a user gesture. The interactable object to open may be identified by identifying a link that interacts with a portion of the user's body. A preview may be generated of the link by accessing content for a URL associated with the link. The physical movement of the user may correspond to a physical movement of the preview. The interactable object may include a wall hanging. The programmable code may also include instructions for determining an orientation for the interactable object by determining a surface normal of a coordinate location, determining the orientation of data associated with the interactable object, and aligning the surface normal of the coordinate location with the orientation of the data associated with the interactable object.

In yet another embodiment, a computer program product embodied on a computer readable medium, the computer readable medium having stored thereon a sequence of instructions which, when executed by a processor causes the processor to execute a method including identifying an interactable object. The method also includes identifying a physical movement of a user corresponding to the interactable object. The method further includes determining a coordinate location for a data associated with the interactable object based upon the physical movement of the user. Moreover, the method includes placing the data associated with the interactable object at the coordinate location corresponding to the physical movement of the user.

In one or more embodiments, a user input device is employed to detect the physical movement of the user corresponding to the window. The user input device may be a haptics controller. The haptics controller may correspond to a totem device having at least six degrees of freedom. The physical movement of the user may be translated into event objects at a processing system associated with the haptics controller, where the event objects correlate to data indicating movement or positioning of the haptics controller. The coordinate location for the interactable object may be determined by identifying a location at which a trigger is released for the haptics controller after the physical movement of the user.

In one or more embodiments, the user input device is a camera to detect a user gesture. The window to open may be identified by identifying a link that interacts with a portion of the user's body. A preview may be generated of the link by accessing content for a URL associated with the link. The physical movement of the user may correspond to a physical movement of the preview. The interactable object may be both opened and placed with a single user interaction of a computing device. The single user interaction may include a single push of a button on the computing device. The sequence of instructions further determines an orientation for the interactable object by determining a surface normal of a coordinate location, determining the orientation of data associated with the interactable object, and aligning the surface normal of the coordinate location with the orientation of the data associated with the interactable object.

In another embodiment, a method includes receiving data indicating a selection of an interactable object at the start of a user interaction. The method also includes receiving data indicating an end of the user interaction with the interactable object. The method further includes determining a location of the interactable object at the end of the user interaction. Moreover, the method includes placing data associated with the interactable object at the location of the interactable object at the end of the user interaction.

In one or more embodiments, the method also includes a user input device providing the data indicating the selection of the interactable object and the data indicating the end of the user interaction with the interactable object. The user input device may be a haptics controller. The haptics controller may correspond to a totem device having at least six degrees of freedom. A physical movement of the user may be translated into event objects at a processing system associated with the haptics controller, where the event objects correlate to data for movement or positioning of the haptics controller. The location of the interactable object at the end of the user interaction may be determined by identifying a location at which a trigger is released for the haptics controller after the selection of the interactable object.

In one or more embodiments, the user input device is a camera to detect a user gesture. The data indicating the selection of the interactable object may correspond to a selection gesture. The data indicating the end of the user interaction with the interactable object may correspond to a release gesture. The data indicating the selection of the interactable object may correspond to at least a portion of the user's body interacting with a link. A preview may be generated of the link by accessing content for a URL associated with the link. The method may also include receiving data indicating a physical movement of the user, where the physical movement of the user corresponds to a physical movement of the preview. The interactable object may be both opened and placed with the user interaction. An orientation for the interactable object may be determined by determining a surface normal of the location of the interactable object at the end of the user interaction, determining the orientation of the data associated with the interactable object, and aligning the surface normal of the coordinate location with the orientation of the data associated with the interactable object. The interactable object may include a wall hanging.

In still another embodiment, a method includes receiving data indicating a selection of an interactable object at the start of a user interaction. The method also includes receiving data indicating an end of the user interaction with the interactable object. The method further includes determining a location of the interactable object at the end of the user interaction. Moreover, the method includes creating a new prism for the data associated with the interactable object at the end of the user interaction when the location of the interactable object at the end of the user interaction is outside of an initial prism of the interactable object.

In one or more embodiments, the method also includes displaying a visual preview of the data associated with the interactable object at the location of the interactable object between the start and the end of the user interaction when the interactable object is located outside the bounds of the initial prism. The method may also include a user input device providing the data indicating the selection of the interactable object and the data indicating the end of the user interaction with the interactable object. The user input device is a haptics controller. The haptics controller may correspond to a totem device having at least six degrees of freedom. A physical movement of the user may be translated into event objects at a processing system associated with the haptics controller, where the event objects correlate to data for movement or positioning of the haptics controller. The location of the interactable object at the end of the user interaction may be determined by identifying a location at which a trigger is released for the haptics controller after the selection of the interactable object.

In one or more embodiments, the user input device is a camera to detect a user gesture. The data indicating the selection of the interactable object may correspond to a selection gesture. The data indicating the end of the user interaction with the interactable object may correspond to a release gesture. The data indicating the selection of the interactable object may correspond to at least a portion of the user's body interacting with a link. A preview may be generated of the link by accessing content for a URL associated with the link. The method may also include receiving data indicating a physical movement of the user, where the physical movement of the user corresponds to a physical movement of the preview. The interactable object may be both opened and placed with the user interaction. An orientation for the interactable object may be determined by determining a surface normal of the location of the interactable object at the end of the user interaction, determining the orientation of the data associated with the interactable object, and aligning the surface normal of the coordinate location with the orientation of the data associated with the interactable object. The interactable object may include a wall hanging.

In yet another embodiment, a method includes receiving data indicating the selection of an interactable object contained within a first prism at the start of a user interaction. The method also includes creating a second prism at a location of the interactable object at an end of the user interaction to contain the data associated with the interactable object when data representing a physical movement of the user corresponding to the user interaction between the start and the end of the user interaction indicates the interactable object is outside of the first prism at the end of the user interaction.

In one or more embodiments, the method also includes a user input device providing the data indicating the selection of the interactable object and the data indicating representing a physical movement of the user corresponding to the user interaction between the start and the end of the user. The user input device may be a haptics controller. The haptics controller may correspond to a totem device having at least six degrees of freedom. A physical movement of the user may be translated into event objects at a processing system associated with the haptics controller, where the event objects correlate to data for movement or positioning of the haptics controller. The location of the interactable object at the end of the user interaction may be determined by identifying a location at which a trigger is released for the haptics controller after the selection of the interactable object.

In one or more embodiments, the user input device is a camera to detect a user gesture. The data indicating the selection of the interactable object may correspond to a selection gesture. The data indicating the end of the user interaction with the interactable object may correspond to a release gesture. The data indicating the selection of the interactable object may correspond to at least a portion of the user's body interacting with a link. A preview may be generated of the link by accessing content for a URL associated with the link. The physical movement of the user may correspond to a physical movement of the preview. The interactable object may be both opened and placed with the user interaction. An orientation for the interactable object may be determined by determining a surface normal of the location of the interactable object at the end of the user interaction, determining the orientation of the data associated with the interactable object, and aligning the surface normal of the coordinate location with the orientation of the data associated with the interactable object. The interactable object may include a wall hanging.

In another embodiment, a system includes a mixed reality display device that is configured to display three dimensional content. The system also includes a user input device configured to detect physical movement of a user. The system further includes a processor that receives and processes data from the user input device. Moreover, the system includes a memory for holding programmable code executable by the processor, where the programmable code includes instructions for receiving data indicating a selection of an interactable object contained within a first prism at the start of a user interaction, receiving data indicating an end of the user interaction with the interactable object, receiving data indicating a physical movement of the user corresponding to removing the interactable object from the first prism between the start and the end of the user interaction, and creating a second prism to contain the data associated with the interactable object at the end of the user interaction with the interactable object.

In still another embodiment, a system includes a mixed reality display device that is configured to display three dimensional content. The system also includes a user input device configured to detect physical movement of a user. The system further includes a processor that receives and processes data from the user input device. Moreover, the system includes a memory for holding programmable code executable by the processor, where the programmable code includes instructions for receiving data indicating a selection of an interactable object at the start of a user interaction, receiving data indicating an end of the user interaction with the interactable object, determining a location of the interactable object at the end of the user interaction, and creating a new prism for the data associated with the interactable object at the end of the user interaction when the location of the interactable object at the end of the user interaction is outside of an initial prism of the interactable object In yet another embodiment, a system includes a mixed reality display device that is configured to display three dimensional content. The system also includes a user input device configured to detect physical movement of a user. The system further includes a processor that receives and processes data from the user input device. Moreover, the system includes a memory for holding programmable code executable by the processor, where the programmable code includes instructions for receiving data indicating the selection of an interactable object contained within a first prism at the start of a user interaction, and creating a second prism at a location of the interactable object at an end of the user interaction to contain the data associated with the interactable object when data representing a physical movement of the user corresponding to the user interaction between the start and the end of the user interaction indicates the interactable object is outside of the first prism at the end of the user interaction.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIG. 5 shows an example of a table to store elements deconstructed from a 2D content, according to some embodiments.

FIG. 7 shows an example of a table to store an inventory of surfaces identified from a user's local environment, according to some embodiments.

FIG. 9 shows an example of a table to store the mapping of elements from a 2D content to surfaces from a user's local environment, according to some embodiments.

FIGS. 12A-F provide an illustrated example of an approach to physically place data associated with interactable objects in a mixed realty environment.

DETAILED DESCRIPTION

Figure 1:
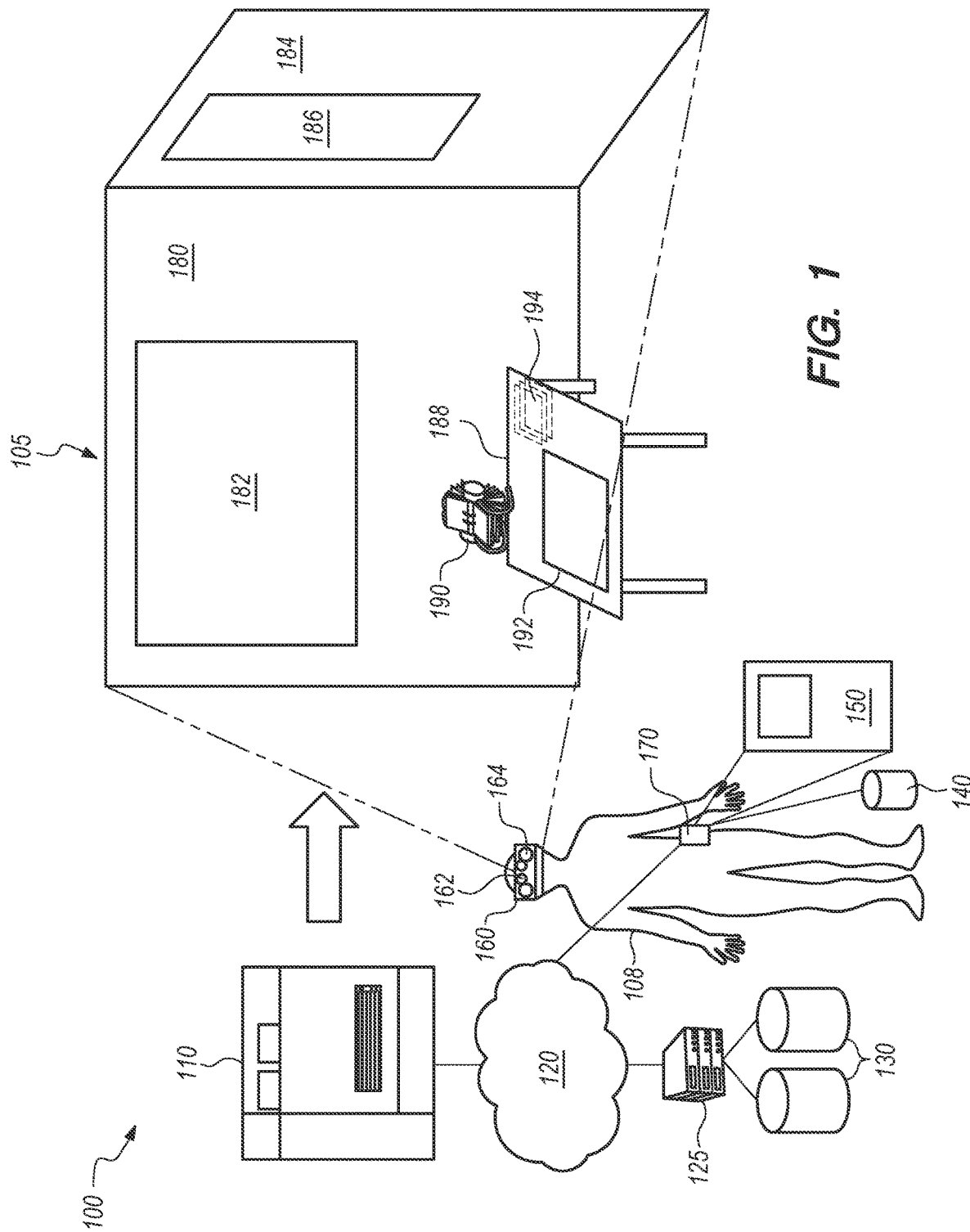
FIG. 1 illustrates an augmented reality environment for deconstructing 2D content to be displayed in a user's 3D environment, according to some embodiments.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

Web Page Deconstruction

Embodiments of the disclosure will deconstruct a 2D web page to be displayed in a spatially organized 3D environment. The 2D web page may originate on a web browser of a head-mounted system, a mobile device (e.g., cell phone), a tablet, a television, an application, and the like. In some embodiments, the 2D web page may be received from another application or device such as a laptop computer, a desktop computer, an email application with a link to the 2D web page, an electronic message referencing or including a link to the 2D web page and the like.

Referring to Figure (FIG. 1, environment 100 is representative of a physical environment and systems for implementing processes described below (e.g., deconstructing 2D content from a web page to be displayed on 3D surfaces in a user's physical environment 105). The representative physical environment and system of the environment 100 includes a user's physical environment 105 as viewed by a user 108 through a head-mounted system 160. The representative system of the environment 100 further includes accessing a 2D content (e.g., a web page) via a web browser 110 operably coupled to a network 120. The network 120 may be the Internet, an internal network, a private cloud network, a public cloud network, etc. The web browser 110 is also operably coupled to a processor 170 via the network 120. Although the processor 170 is shown as an isolated component separate from the head-mounted system 160, in an alternate embodiment, the processor 170 may be integrated with one or more components of the head-mounted system 160, and/or may be integrated into other system components within the environment 100 such as, for example, the network 120 to access a computing network 125 and storage devices 130. The processor 170 may be configured with software 150 for receiving and processing information such as video, audio and content received from the head-mounted system 160, a local storage device 140, the web browser 110, the computing network 125, and the storage devices 130. The software 150 may communicate with the computing network 125 and the storage devices 130 via the network 120. The software 150 may be installed on the processor 170 or, in another embodiment; the features and functionalities of software may be integrated into the processor 170. The processor 170 may also be configured with the local storage device 140 for storing information used by the processor 170 for quick access without relying on information stored remotely on an external storage device from a vicinity of the user 108. In other embodiments, the processor 170 may be integrated within the head-mounted system 160.

The user's physical environment 105 is the physical surroundings of the user 108 as the user moves about and views the user's physical environment 105 through the head-mounted system 160. For example, referring to FIG. 1, the user's physical environment 105 shows a room with two walls (e.g., main wall 180 and side wall 184, the main wall and side wall being relative to the user's view) and a table 188. On the main wall 180, there is a rectangular surface 182 depicted by a solid black line to show a physical surface with a physical border (e.g., a painting hanging or attached to a wall, or a window, etc.) that may be a candidate surface to project certain 2D content onto. On the side wall 184, there is a second rectangular surface 186 depicted by a solid black line to show a physical surface with a physical border (e.g., a painting hanging or attached to a wall or a window, etc). On the table 188, there may be different objects. 1) A virtual Rolodex 190 where certain 2D content may be stored and displayed; 2) a horizontal surface 192 depicted by a solid black line to represent a physical surface with a physical border to project certain 2D content onto; and 3) multiple stacks of virtual square surfaces 194 depicted by a dotted black line to represent, for example, stacked virtual newspaper where certain 2D content may be stored and displayed.

The web browser 110 may also display a blog page from the internet or within an intranet/private network. Additionally, the web browser 110 may also be any technology that displays digital 2D content. 2D content may include, for example, web pages, blogs, digital pictures, videos, news articles, newsletters, or music. The 2D content may be stored in the storage devices 130 that are accessible by the user 108 via the network 120. In some embodiments, 2D content may also be streaming content, for example, live video feeds or live audio feeds. The storage devices 130 may include, for example, a database, a file system, a persistent memory device, a flash drive, a cache, etc. In some embodiments, the web browser 110 containing 2D content (e.g., web page) is displayed via computing network 125.

The computing network 125 accesses the storage devices 130 to retrieve and store 2D content for displaying in a web page on the web browser 110. In some embodiments, the local storage device 140 may provide 2D content of interest to the user 108. The local storage device 140 may include, for example, a flash drive, a cache, a hard drive, a database, a file system, etc. Information stored in the local storage device 140 may include recently accessed 2D content or recently displayed content in a 3D space. The local storage device 140 allows improvements in performance to the systems of the environment 100 by providing certain content locally to the software 150 for helping to deconstruct 2D content to display the 2D content on the 3D space environment (e.g., 3D surfaces in the user's physical environment 105).

The software 150 includes software programs stored within a non-transitory computer readable medium to perform the functions of deconstructing 2D content to be displayed within the user's physical environment 105. The software 150 may run on the processor 170 wherein the processor 170 may be locally attached to the user 108, or in some other embodiments, the software 150 and the processor 170 may be included within the head-mounted system 160. In some embodiments, portions of the features and functions of the software 150 may be stored and executed on the computing network 125 remote from the user 108. For example, in some embodiments, deconstructing 2D content may take place on the computing network 125 and the results of the deconstructions may be stored within the storage devices 130, wherein the inventorying of a user's local environment's surfaces for presenting the deconstructed 2D content on may take place within the processor 170 wherein the inventory of surfaces and mappings are stored within the local storage device 140. In one embodiment, the processes of deconstructing 2D content, inventorying local surfaces, mapping the elements of the 2D content to local surfaces and displaying the elements of the 2D content may all take place locally within the processor 170 and the software 150.

The head-mounted system 160 may be a virtual reality (VR) or augmented reality (AR) head-mounted system that includes a user interface, a user-sensing system, an environment sensing system, and a processor (all not shown). The head-mounted system 160 presents to the user 108 an interface for interacting with and experiencing a digital world. Such interaction may involve the user and the digital world, one or more other users interfacing the environment 100, and objects within the digital and physical world.

The user interface may include receiving 2D content and selecting elements within the 2D content by user input through the user interface. The user interface may be at least one or a combination of a haptics interface devices, a keyboard, a mouse, a joystick, a motion capture controller, an optical tracking device and an audio input device. A haptics interface device is a device that allows a human to interact with a computer through bodily sensations and movements. Haptics refers to a type of human-computer interaction technology that encompasses tactile feedback or other bodily sensations to perform actions or processes on a computing device.

The user-sensing system may include one or more sensors 162 operable to detect certain features, characteristics, or information related to the user 108 wearing the head-mounted system 160. For example, in some embodiments, the sensors 162 may include a camera or optical detection/scanning circuitry capable of detecting real-time optical characteristics/measurements of the user 108 such as, for example, one or more of the following: pupil constriction/dilation, angular measurement/positioning of each pupil, spherocity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's physical environment 105. Objects or information detected by the sensors 164 may be provided as input to the head-mounted system 160. In some embodiments, this input may represent user interaction with the virtual world. For example, a user (e.g., the user 108) viewing a virtual keyboard on a desk (e.g., the table 188) may gesture with their fingers as if the user was typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for interpreting scene information, for example, through continuously and/or intermittently projected infrared structured light. The environment-sensing system may be used for mapping one or more elements of the user's physical environment 105 around the user 108 by detecting and registering the local environment, including static objects, dynamic objects, people, gestures and various lighting, atmospheric and acoustic conditions. Thus, in some embodiments, the environment-sensing system may include image-based 3D reconstruction software embedded in a local computing system (e.g., the processor 170) and operable to digitally reconstruct one or more objects or information detected by the sensors 164.

In one exemplary embodiment, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

As mentioned above, the processor 170 may, in some embodiments, be integrated with other components of the head-mounted system 160, integrated with other components of system of the environment 100, or may be an isolated device (wearable or separate from the user 108) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., the computing network 125, and the user-sensing system and the environment-sensing system from the head-mounted system 160) into image and audio data, wherein the images/video and audio may be presented to the user 108 via the user interface (not shown).

The processor 170 handles data processing for the various components of the head-mounted system 160 as well as data exchange between the head-mounted system 160 and 2D content from web pages displayed or accessed by web browser 110 and the computing network 125. For example, the processor 170 may be used to buffer and process data streaming between the user 108 and the computing network 125, thereby enabling a smooth, continuous and high fidelity user experience. Deconstructing 2D content from a web page into elements and mapping the elements to be displayed on surfaces in a 3D environment may be accomplished in an intelligent and logical manner. A predetermined set of rules may be available to recommend, suggest, or dictate where to place certain types of elements/content identified within a 2D content/web page. For example, certain types of 2D content elements may have one or more content elements that may need to be mapped to a physical or virtual object surface amenable for storing and displaying the one or more elements while other types of 2D content elements may be a single object, such as a main video or main article within a web page, in which case, the single object may be mapped to a surface that makes the most sense to display a single object to the user.

Figure 2:
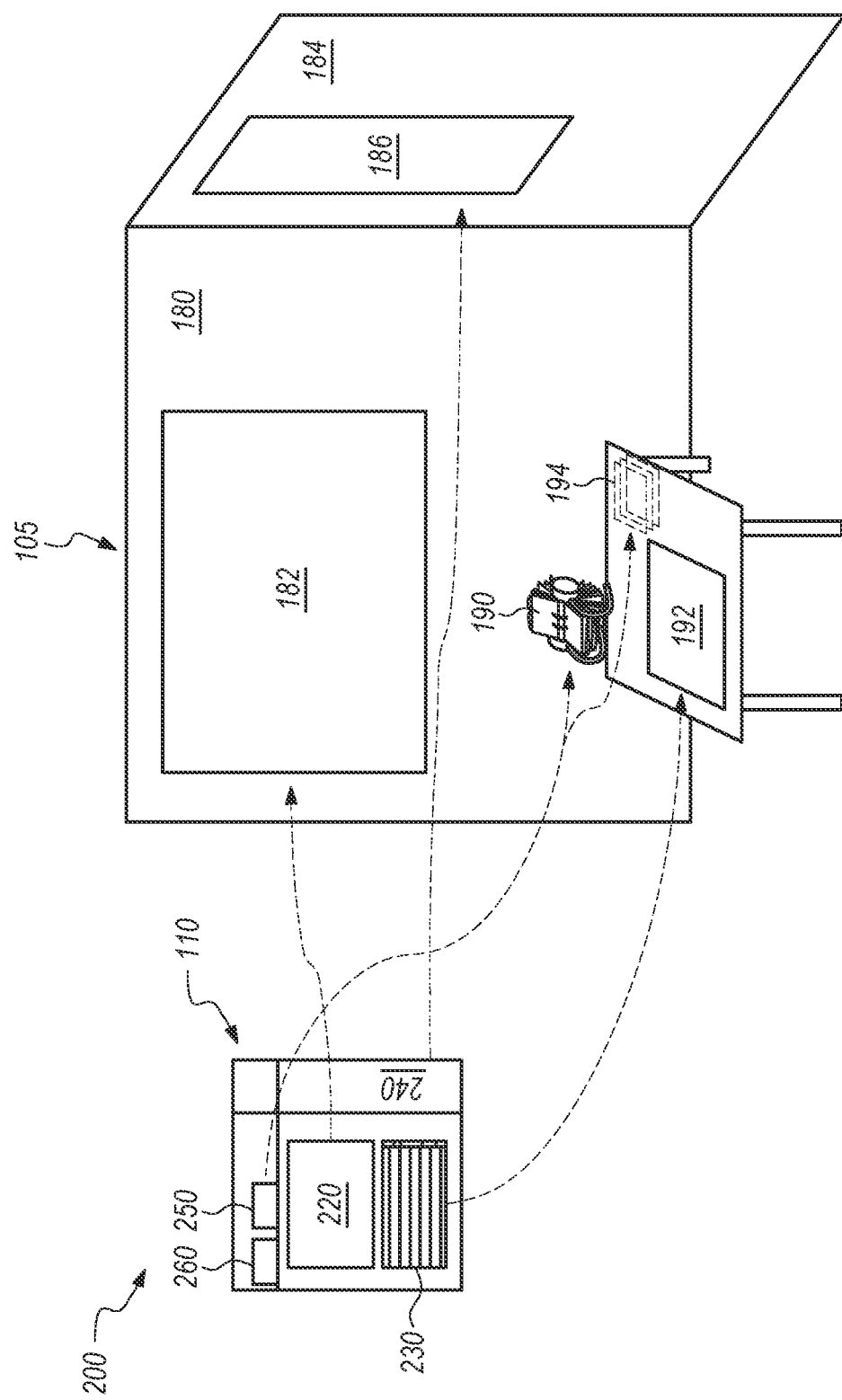
FIG. 2 illustrates an example mapping of elements of a 2D content to a user's 3D environment, according to some embodiments.

FIG. 2 illustrates an example mapping of elements of a 2D content to a user's 3D environment, according to some embodiments. Environment 200 depicts a 2D content (e.g., a web page) displayed or accessed by a web browser 110 and a user's physical environment 105. The dotted lines with an arrow head depict elements (e.g., particular types of content) from the 2D content (e.g., web page) that are mapped to and displayed upon the user's physical environment 105. Certain elements from the 2D content are mapped to certain physical or virtual objects in the user's physical environment 105 based on either web designer hints or pre-defined browser rules.

As an example, 2D content accessed or displayed by the web browser 110 may be a web page having multiple tabs, wherein a current active tab 260 is displayed and a secondary tab 250 is currently hidden until selected upon to display on the web browser 110. Displayed within the active tab 260 is typically a web page. In this particular example, the active tab 260 is displaying a YOUTUBE page including a main video 220, user comments 230, and suggested videos 240. As depicted in this exemplary example, FIG. 2, the main video 220 may be mapped to display on vertical surface 182, the user comments 230 may be mapped to display on horizontal surface 192, and suggested videos 240 may be mapped to display on a different vertical surface 186 from the vertical surface 182. Additionally, the secondary tab 250 may be mapped to display on a virtual Rolodex 190 and/or on a multi-stack virtual object 194. In some embodiments, specific content within the secondary tab 250 may be stored in the multi-stack virtual object 194. In other embodiments, the entire content residing within the secondary tab 250 may be stored and/or displayed on the multi-stack virtual object 194. Likewise, the virtual Rolodex 190 may contain specific content from the secondary tab 250 or the virtual Rolodex 190 may contain the entire content residing within the secondary tab 250.

The vertical surface 182 may be any type of structure which may already be on a main wall 180 of a room (depicted as the user's physical environment 105) such as a window pane or a picture frame. In some embodiments, the vertical surface 182 may be an empty wall where the head-mounted system 160 determines an optimal size of the frame of the vertical surface 182 that is appropriate for the user 108 to view the main video 220. This determination of the size of the vertical surface 182 may be based at least in part on the distance the user 108 is from the main wall 180, the size and dimension of the main video 220, the quality of the main video 220, the amount of uncovered wall space, and/or the pose of the user when looking at the main wall 180. For instance, if the quality of the main video 220 is of high definition, the size of the vertical surface 182 may be larger because the quality of the main video 220 will not be adversely affected by the vertical surface 182. However, if the video quality of the main video 220 is of poor quality, having a large vertical surface 182 may greatly hamper the video quality, in which case, the methods and systems of the present disclosure may resize/redefine the vertical surface 182 to be smaller to minimize poor video quality from pixilation.

The vertical surface 186, like the vertical surface 182, is a vertical surface on an adjacent wall (e.g., side wall 184) in the user's physical environment 105. In some embodiments, based on the orientation of the user 108, the side wall 184 and the vertical surface 186 may appear to be slanted surfaces on an incline. The slanted surfaces on an incline may be a type of orientation of surfaces in addition to vertical and horizontal surfaces. The suggested videos 240 from the YOUTUBE web page may be placed on the vertical surface 186 on the side wall 184 to allow the user 108 to be able to view suggested videos simply by moving the their head slightly to the right in this example.

The virtual Rolodex 190 may be a virtual object created by the head-mounted system 160 and displayed to the user 108. The virtual Rolodex 190 may have the ability for the user 108 to bi-directionally cycle through a set of virtual pages. The virtual Rolodex 190 may contain entire web pages or it may contain individual articles or videos or audios. As shown in this example, the virtual Rolodex 190 may contain a portion of the content from the secondary tab 250 or in some embodiments, the virtual Rolodex 190 may contain the entire page of the secondary tab 250. In some embodiments, the virtual Rolodex 190 may also contain all or part of the contents of the first tab. The user 108 may bi-directionally cycle through content within the virtual Rolodex 190 by simply focusing on a particular tab within the virtual Rolodex 190 and the one or more sensors (e.g., the sensors 162) within the head-mounted system 160 will detect the eye focus of the user 108 and cycle through the tabs within the virtual Rolodex 190 accordingly to obtain relevant information for the user 108. In some embodiments, the user 108 may choose the relevant information from the virtual Rolodex 190 and instruct the head-mounted system 160 to display the relevant information onto either an available surrounding surface or on yet another virtual object such as a virtual display in close proximity to the user 108 (not shown).

The multi-stack virtual object 194, similar to virtual Rolodex 190, may contain content ranging from full contents from one or more tabs or particular contents from various web pages or tabs that the user 108 bookmarks, saves for future viewing, or has open (i.e., inactive tabs). The multi-stack virtual object 194 is also similar to a real-world stack of newspapers. Each stack within the multi-stack virtual object 194 may pertain to a particular newspaper article, page, magazine issue, recipe, etc. One of ordinary skill in the art may appreciate that there can be multiple types of virtual objects to accomplish this same purpose of providing a surface to place 2D content elements or content from a 2D content source.

One of ordinary skill in the art may appreciate that 2D content accessed or displayed by the web browser 110 may be more than just a web page. In some embodiments, 2D content may be pictures from a photo album, videos from movies, TV shows, YOUTUBE videos, interactive forms, etc. Yet in other embodiments, 2D content may be e-books, or any electronic means of displaying a book. Finally, in other embodiments, 2D content may be other types of content not yet described because 2D content is generally how information is presented currently. If an electronic device can consume a 2D content, then the 2D content can be used by the head-mounted system 160 to deconstruct and display the 2D content in a 3D setting (e.g., AR).

In some embodiments, mapping the accessed 2D content may include extracting the 2D content (e.g., from the browser) and putting it on a surface (such that the content is no longer in the browser and only on the surface), and in some embodiments, the mapping can include replicating content (e.g., from the browser) and putting it on a surface (such that the content is both in the browser and on the surface). Deconstructing 2D content is a technical problem that exists in the realm of the Internet and computer-related technology. 2D content such as web pages are constructed using certain types of programming languages such as HTML to instruct computer processors and technical components where and how to display elements within the web pages on a screen for a user. As discussed above, a web designer typically works within the limitation of a 2D canvas (e.g., a screen) to place and display elements (e.g., content) within the 2D canvas. HTML tags are used to determine how an HTML document or portions within the HTML document are formatted. In some embodiments, the (extracted or replicated) 2D content can maintain the HTML tag reference, and in some embodiments, the HTML tag reference may be redefined.

Figure 3:
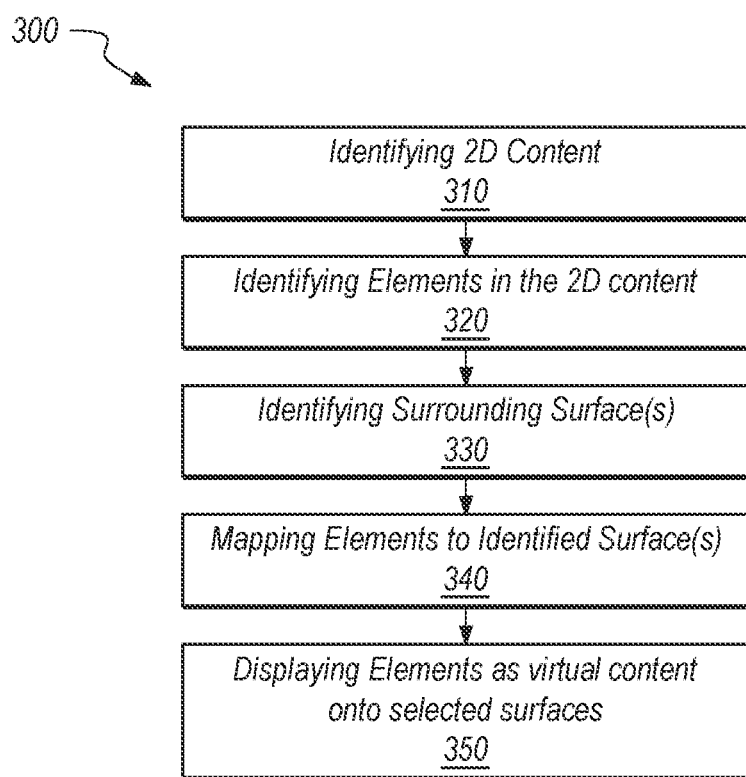
FIG. 3 is a flow diagram illustrating a method for deconstructing 2D content to be displayed in a 3D environment, according to some embodiments.

FIG. 3 is a flow diagram illustrating a method for deconstructing 2D content to be displayed in a 3D environment, according to some embodiments. The method includes identifying 2D content at 310, identifying elements in the 2D contents at 320, identifying surrounding surfaces at 330, mapping identified elements in the identified 2D contents to identified surfaces from the identifying surrounding surfaces at 340, and displaying elements as virtual content onto selected surfaces at 350, wherein the selected surfaces are selected from the mapping of the elements to the identified surfaces.

Identifying 2D content at 310 may involve the use of the head-mounted system 160 to search for digital content. Identifying 2D content at 310 may also include accessing digital content on servers (e.g., the storage devices 130) connected to the network 120. Identifying 2D content at 310 may include browsing the Internet for web pages that are of interest to the user 108. In some embodiments, identifying 2D content at 310 may include voice-activated commands given by the user 108 for searching content on the Internet. For example, a user 108 may be interacting with a device (e.g., head-mounted system 160) wherein the user 108 is searching for a particular video on the Internet by asking the device to search for the particular video by saying a command to search for a video and then saying the name of the video and a brief description of the video. The device may then search the Internet and pull up the video on a 2D browser to allow the user 108 to see the video as displayed on the 2D browser of the device. The user 108 may then confirm that the video is a video that the user 108 would like to view in the spatial 3D environment.

Once 2D content is identified, the method identifies elements in the 2D content at 320 to take inventory of the available elements within the 2D content for displaying to the user 108. The elements within the 2D content, for example, may include videos, articles and newsletters posted on a web page, comments and postings on a social media website, blog posts, pictures posted on various websites, audio books, etc. These elements within the 2D content (e.g., a web page) may contain HTML tags having attributes associated with HTML tags provided by a content designer to define where on the web page a particular element is placed and in some cases, when and how the element is to be displayed on the web page. In some embodiments, the methods and systems of the present disclosure will utilize these HTML tags and attributes as hints and suggestions provided by the content designer to aid in the mapping process at 340 to determine where and how to display the element in a 3D setting. For example, below is an example HTML Web Page code provided by the web page developer. Example HTML Web Page Code Provided by a Web Page Developer

```
/*
measurement values can be given in cm since ml objects are meant to work in
the real world environment
type : hint for preference in surface type to match to;
priority : hint for preference in getting the desired surface during matching, with
range [1,100], where 1 is low priority and 100 is top priority.
algorithm. higher value is higher priority (like z-index CSS property);
distance-depth: for the stack layout, distance between adjacent stacked objects;
*/
<!DOCTYPE HTML>
<html>
<head> ... </head>
<body>
...
<ml-layout id="video" layout="plane" style="type:vertical; priority: 100;">
    <ml-container width="200cm" height="120cm">
        <div id="current_video" ... >
            <video ... >
            ...
            </video>
        </div>
    </ml-container>
</ml-layout>
<ml-layout id="recommendations" layout="stack" style="type:horizontal;
priority:90; distance-depth:20cm;">
    <ml-container width="50cm" height="50cm">
      <div id="video_recommendation_1">
        ...
      </div>
    </ml-container>
    <ml-container width="50cm" height="50cm">
      <div id="video_recommendation_2">
        ...
```

```
    </div>
  </ml-container>
</ml-layout>
...
</body>
</html>
```

The example HTML Web Page code provided by a web page developer includes a preference on how to display the main video on a web page, and a preference on how to display recommended (or suggested videos). In particular, this HTML web page code uses the tag of "style" to specify how to display the main video using a type value of "vertical" to designate a vertical surface to display the video. Additionally, within the "style" tag, additional hints provided by the web page developer may include a "priority" preference for a matching algorithm to use to prioritize which HTML element/content within the web page (e.g., the main video) should be mapped to which potential surface area. In the example HTML Web Page code, the priority was set at a value of 100 for the video having a vertical plane layout, wherein in this example, a higher priority value indicates a higher priority. Additionally, in this example, a preference is indicated by the web page developer to place the suggested videos in a stack having a type value of "horizontal" in a stack layout, wherein the distance between the stacked objects (e.g., in this case, a suggested video in relation to another suggested video) should be 20 cm.

Figure 4:
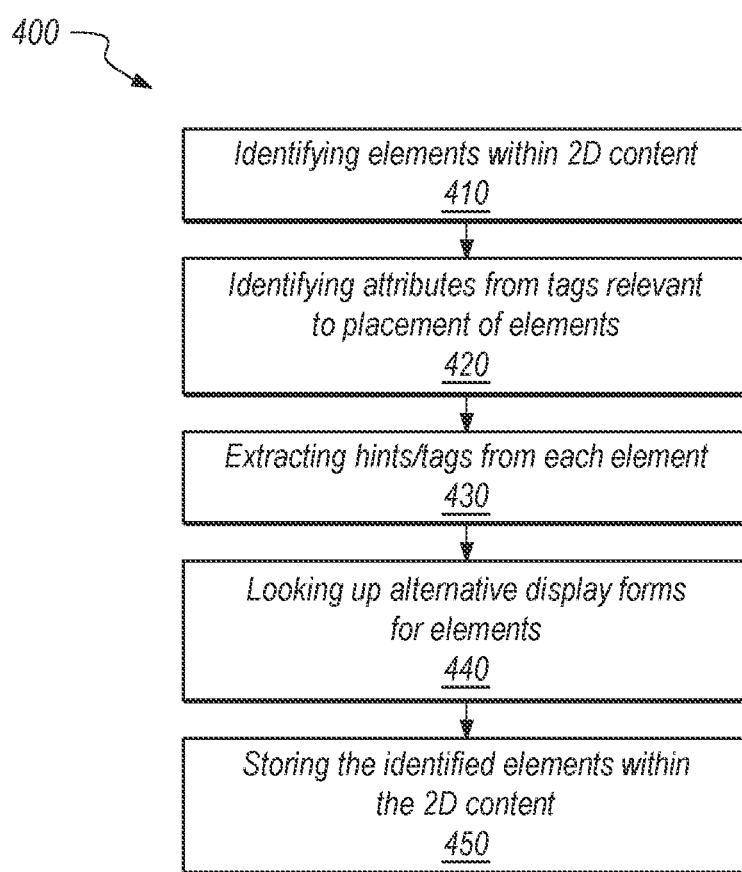
FIG. 4 is a flow diagram illustrating a method for identifying elements in a 2D content, according to some embodiments.

FIG. 4 is a flow diagram illustrating a method for identifying elements in a 2D content, according to some embodiments. FIG. 4 is a detailed flow disclosing identifying elements in the 2D content at 320 of FIG. 3, according to some embodiment. FIG. 4 begins with identifying elements within 2D content at 410, similar to identifying elements in the 2D content at 320 of FIG. 3. The method proceeds to the next step of identifying attributes from tags pertaining to placement of content at 420. As discussed above, a web page designer, while designing and configuring a web page, may associate elements within the web page to HTML tags to define where and how to display each element. These HTML tags may also include attributes pertaining to placement of the element onto a particular portion of the web page. It is these HTML tags and their attributes that the head-mounted system 160 will detect and coordinate with other components of the system to use as input as to where the particular element could be displayed.

Extracting hints or tags from each element is performed at 430. The hints or tags are typically formatting hints or formatting tags that are provided by the content designer of the 2D content/web page and/or a web page developer. As discussed above, the content designer may provide instructions or hints, for example, in the form of HTML tags as shown in the "Example HTML Web Page code provided by the web page developer," to instruct the web browser 110 to display the elements of a 2D content in a particular portion of the page or screen. In some embodiments, a web page designer may use additional HTML tag attributes to define additional formatting rules. For example, if the user has a reduced sensitivity to a specific color (e.g., red), do not display red and instead use another color, or as discussed above, if a video that had a preference to be displayed on a vertical surface cannot be displayed on a vertical surface, alternatively display the video on another (physical) surface or create a virtual surface and display the video on the virtual surface. Below is an example HTML Page parser implemented in a browser for parsing through an HTML page to extract hints/tags from each element within the HTML page.

Example HTML Page Parser Implemented in a Browser

```
vector<WorldSurface> m_world_surfaces;
vector<MLLayout> m_layouts;
struct WorldSurface {
  // world position of the planar surface (x, y, z)
  vec3 position;
  // world orientation of the planar surface (x, y, z)
  vec3 rotation;
  // width and height of the planar surface
  float width;
  float height;
  // type = vertical, horizontal, inclined, etc.
  string type;
}
void PopulateWorldSurfaceList( ) {
  QueryWorldSurfacesFromEnvironment( );
  while (is_world_scan_in_progress) {
    WorldSurface surface;
    surface.width = CalculateLatestSurfaceSize( ).width( );
    surface.height = CalculateLatestSurfaceSize( ).height( );
    surface.position = CalculateLatestSurfaceTransform( ).pos( );
    surface.rotation = CalculateLatestSurfaceTransform( ).rot( );
    float distance_to_surface =
      (Camera( ).position - surface.position).distance( );
    vec3 gravity_direction = vec3(0, -1, 0); // always down
    vec3 surface_normal = CalculateLatestSurfaceNormal( );
    // determines surface type based on the angle between surface
    // normal and gravity vector
    surface.type = DetermineLatestSurfaceType(gravity, surface_normal);
    m_world_surfaces.push_back(surface);
  }
}
struct MLContainer {
  float width;
  float height;
}
struct MLLayout {
  // planar, list, grid, stack, etc.
  string layout;
  // hint used for matching algorithm
  int priority;
  // hint used for matching algorithm: vertical, horizontal
  string type;
  // any extra layout specific properties: e.g distance-depth
  string[ ] properties;
  // each layout consists of 1+ layout objects
  vector<MLContainer> objects;
}
void ParseHTMLDocumet(string url) {
  WebDocument document = LoadURL(url);
  Tag[ ] tags = document.ParseTags( );
  for (int i = 0; i < tags.size( ); i++) {
    if (tags[i].name == "ml-layout") {
      MLLayout ml_layout;
      ml_layout.layout = tags[i].propertyValue("layout");
      ml_layout.priority = tags[i].propertyValue("priority");
      ml_layout.type = tags[i].propertyValue("type");
      ml_layouts.push_back(ml_layout);
      while (tags[i].children( ) != NULL) {
        if (tags[i].GetNextChild( ).name == "ml-container") {
          MLContainer ml_container;
          ml_container.width =
            tags[i].propertyValue("width");
          ml_container.height =
```

```
            tags[i].propertyValue("height");
            ml_layout.objects.push_back(ml_container);
          }
        }
      }
    }
  }
}
void main( ) {
  // url is loaded already into the page from user input
  string url = GetWebPageURL( );
  ParseHTMLDocument(url);
  // world is already being scanned while a device with sensors is running
  PopulateWorldSurfaceList( );
  DoMatchLayouts ToSurfaces(ml_layouts, m_world_surfaces);
}
```

The example HTML Page parser shows how an HTML page containing HTML tags used to provide display preferences for particular elements/objects within a 2D content (e.g., web page) can be parsed and identified and/or extracted/replicated. As disclosed in the example HTML Page parser, elements within a 2D content (e.g., a web page) can be parsed using the sample code disclosed. Certain HTML tags using various element names and values may be identified/extracted by the HTML Page parser (e.g., ML.layout, ML.container, etc.) to determine how the particular element is to be displayed to a user in a 3D environment (e.g., by mapping the element to a particular surface).

Looking up/searching alternative display forms for the one or more elements is performed at 440. Certain formatting rules may be specified for an image on a web page. For example, if the web browser 110 is capable of displaying a 3D version of the image, the web page designer may place an additional tag or define certain attributes of a particular tag to allow the web browser 110 to recognize that the image may have an alternative version of the image (e.g., a 3D version of the image). The web browser 110 may then access the alternative version of the image (e.g., the 3D version of the image) to be displayed in the 3D enabled browser.

Storing the identified elements within the 2D content is performed at 450. The method may store the identified elements into a non-transitory storage medium to be used by a mapping routine (e.g., mapping the elements to the identified surfaces at 340 of FIG. 3) to map the elements to particular surfaces. The non-transitory storage medium may include a data storage device such as the storage device 130 or the local storage device 140. The elements may be stored in a particular table such as the table disclosed in FIG. 5, described below. In some embodiments, the identified elements within the 2D content may be stored in a transitory storage medium.

FIG. 5 shows an example of a table to store elements deconstructed from a 2D content, according to some embodiments. Elements table 500 is an exemplary table that can store the results of the identifying elements within 2D content at 410 of FIG. 4 in a database. The elements table 500 includes, for example, information about the one or more elements within the 2D content including an element identification (ID) 510, a preference indicator 520 for where the element could be placed on a 3D surface, a parent element ID 530 if the particular element is included within a parent element, a child element ID 540 if the element may contain a child element, and a multiple entity indicator 550 to indicate whether the element contains multiple embodiments that may warrant the need to have the surface or virtual object that is used to display the element be compatible with displaying multiple versions of the elements. A parent element is an element/object within the 2D content that may contain sub-elements (e.g., child elements). For example, the Element ID having a value of 220 (e.g., main video 220) has a Parent Element ID value of 260 (e.g., active tab 260), which indicates that the main video 220 is a child element of the active tab 260. Or stated in a different way, the main video 220 is included within the active tab 260. Continuing with the same example, the main video 220 has a Child Element ID 230 (e.g., user comments 230) which indicates that the user comments 230 is associated with the main video 220. One of ordinary skill in the art may appreciate the elements table 500 may be a table in a relational database or in any type of database. Additionally, the elements table 500 may be an array in a computer memory (e.g., a cache) containing the results of the identifying elements within 2D content at 410 of FIG. 4.

Each row of rows 560 in the elements table 500 corresponds to an element from within a web page. The element ID 510 is a column containing a unique identifier for each element (e.g., an element ID). In some embodiments, an element's uniqueness may be defined as a combination of the element ID 510 column and another column within the table (e.g., the preference 520 column if there is more than one preference identified by the content designer). The preference 520 is a column whose value may be determined based at least in part on the HTML tags and attributes defined by the content designer/developer (e.g., a web page designer) and identified by the system and method as disclosed in extracting hints or tags from each element at 430 of FIG. 4. In other embodiments, the preference 520 column may be determined based at least in part on predefined browser rules to specify where certain types of elements within a web page should be displayed within a 3D environment. These predefined rules may provide suggestions to the systems and methods to determine where to best place the element in the 3D environment.

The parent element ID 530 is a column that contains the element ID of a parent element that this particular element in the current row is displayed within or is related to. A particular element within a web page may be embedded, placed within another element of the page, or related to another element on the page. For example, in the current embodiment, a first entry of the element ID 510 column stores a value of element ID 220 corresponding to the main video 220 of FIG. 2. A preference value in the preference 520 column corresponding to the main video 220 is determined based on the HTML tags and/or attributes and, in the current embodiment, is that this element should be placed in the "Main" location of a user's physical environment 105. Depending on the current location of the user 108, that main location may be a wall in a living room, or a stove top hood in a kitchen that the user 108 is currently looking at, or if in a wide-open space, may be a virtual object that is projected in front of the line of site of the user 108 that the main video 220 may be projected onto. More information on how the elements of 2D content are displayed to the user 108 will be disclosed in a later section. In continuing with the current example, the parent element ID 530 column stores a value of element ID 260 corresponding to the active tab 260 of FIG. 2. Therefore, the main video 220 is a child of the active tab 260.

The child element ID 540 is a column that contains the element ID of a child element that this particular element in the current row has displayed within or is related to. A particular element within a web page may be embedded, placed within another element of the page, or related to another element on the page. In continuing with the current example, the child element ID 540 column stores a value of element ID 230 corresponding to the user comments 230 of FIG. 2.

The multiple entity indicator 550 is a column that indicates whether the element contains multiple entities that may warrant the need to have the surface or virtual object that is used to display the element be compatible with displaying multiple versions of the elements (e.g., the element may be the user comments 230, wherein for the main video 220, there may be more than one comment available). In continuing with the current example, the multiple entity indicator 550 column stores a value of "N" to indicate that the main video 220 does not have or correspond to multiple main videos in the active tab 260 (e.g., "No" multiple versions of the main video 220).

In continuing with the current example, a second entry of the element ID 510 column stores a value of element ID 230 corresponding to the user comments 230 of FIG. 2. A preference value in the preference 520 column corresponding to the user comments 230 shows a preference of "Horizontal" to indicate that the user comments 230 should be placed on a "Horizontal" surface somewhere in the user's physical environment 105. As discussed above, the horizontal surface will be determined based on available horizontal surfaces in the user's physical environment 105. In some embodiments, the user's physical environment 105 may not have a horizontal surface, in which case, the systems and methods of the current disclosure may identify/create a virtual object with a horizontal surface to display the user comments 230. In continuing with the current example, the parent element ID 530 column stores a value element ID 220 corresponding to the main video 220 of FIG. 2, and the multiple entity indicator 550 column stores a value of "Y" to indicate that user comments 230 may contain more than one value (e.g., more than one user comment).

The remaining rows within the elements table 500 contain information for the remaining elements of interest to the user 108. One of ordinary skills in the art may appreciate that storing the results of the identifying elements within the 2D content at 410 improves the functioning of the computer itself because once this analysis has been performed on the 2D content, it may be retained by the system and method for future analysis of the 2D content if another user is interested in the same 2D content. The system and method for deconstructing this particular 2D content may be avoided since it has already been completed before.

In some embodiments, the element table 500 may be stored in the storage devices 130. In other embodiments, the element table 500 may be stored in the local storage device 140 for quick access to recently viewed 2D content or for possible revisit to the recently viewed 2D content. Yet in other embodiments, the element table 500 may be stored at both the storage devices 130 located remotely from the user 108 and the local storage device 140 located local to the user 108.

Returning to FIG. 3, the method continues with identifying surrounding surfaces at 330. The user 108 may view the user's physical environment 105 through the head-mounted system 160 to allow the head-mounted system 160 to capture and identify surrounding surfaces such as a wall, a table, a painting, a window frame, a stove, a refrigerator, a TV, etc. The head-mounted system 160 is aware of the real objects within the user's physical environment 105 because of the sensors and cameras on the head-mounted system 160 or with any other type of similar device. In some embodiments, the head-mounted system 160 may match the real objects observed within the user's physical environment 105 with virtual objects stored within the storage devices 130 or the local storage device 140 to identify surfaces available with such virtual objects. Real objects are the objects identified within the user's physical environment 105. Virtual objects are objects that are not physically present within the user's physical environment, but may be displayed to the user to appear as though the virtual objects are present in the user's physical environment. For example, the head-mounted system 160 may detect an image of a table within the user's physical environment 105. The table image may be reduced to a 3D point cloud object for quick and efficient comparison and matching at the storage devices 130 or the local storage device 140. If a match of the real object and a 3D point cloud object (e.g., of a table) is detected, the system and method will identify the table as having a horizontal surface because the 3D point cloud object representing a table is defined as having a horizontal surface. A more detailed description of the identifying surrounding surfaces is disclosed below in FIG. 6.

In some embodiments, the virtual objects may be extracted objects, wherein an extracted object may be a physical object identified within the user's physical environment 105, but is displayed to the user as a virtual object in the physical object's place so that additional processing and associations can be made to the extracted object that would not be able to be done on the physical object itself (e.g., to change the color of the physical object to highlight a particular feature of the physical object, etc.). Additionally, extracted objects may be virtual objects extracted from the 2D content (e.g., a web page from a browser) and displayed to the user 108. For example, a user 108 may choose an object such as a couch from a web page displayed on a 2D content/web page to be displayed within the user's physical environment 105. The system may recognize the chosen object (e.g., the couch) and display the extracted object (e.g., the couch) to the user 108 as if the extracted object (e.g., the couch) is physically present in the user's physical environment 105. Additionally, virtual objects may also include objects that have surfaces for displaying content (e.g., a transparent display screen in close proximity to the user for viewing certain content) that are not even in the physical presence of the user's physical environment 105, but from a displaying content from the 2D content perspective, may be an ideal display surface to present certain content to the user.

Figure 6:
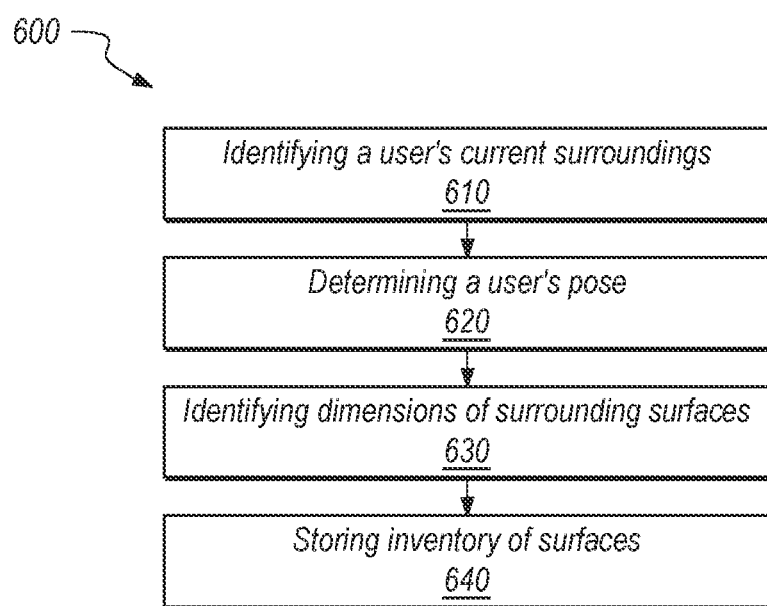
FIG. 6 is a flow diagram illustrating a method for identifying surfaces from a user's local environment, according to some embodiments.

FIG. 6 is a flow diagram illustrating a method for identifying surfaces from a user's local environment, according to some embodiments. FIG. 6 is a detailed flow disclosing the identifying surrounding surfaces at 330 of FIG. 3. FIG. 6 begins with identifying a user's current surroundings at 610, similar to identifying surrounding surfaces at 330 of FIG. 3. The method proceeds to the next step of determining a user's pose at 620.

Determining the user's pose at 620 is an important step to identifying a user's current surrounding because the user's pose will provide perspective for the user 108 in relation to the objects within the user's physical environment 105. For example, referring back to FIG. 1, the user 108, using the head-mounted system 160, is observing the user's physical environment 105. Determining the user's pose at 620 (i.e., vector and/or origin position information relative to the world) will help the head-mounted system 160 understand, for example, (1) how tall the user 108 is in relation to the ground, (2) the angle the user 108 has to rotate their head to move about and capture the images of the room, and (3) the distance between the user 108 to the table 188, the main wall 180 and the side wall 184. Additionally, the pose of the user 108 is also helpful to determine the angle of the head-mounted system 160 when observing vertical surfaces 182 and 186, along with other surfaces within user's physical environment 105.

At 630, the method identifies dimensions of the surrounding surfaces. Each candidate surface within the user's physical environment 105 is tagged and categorized with a corresponding dimension. In some embodiments, each candidate surface within the user's physical environment 105 is also tagged and categorized with a corresponding orientation. This information will be helpful to identify which element should map to which surfaces, based at least in part on the dimension of the surface, the orientation of the surface, the distance the user 108 is away from the particular surface, and type of information that needs to be displayed for the element. For example, a video can be shown further away than a blog or an article that may contain an abundance of information where the text size of the article may be too small for a user to see if displayed on a distant wall with small dimensions.

At 640, the method stores an inventory of the surrounding surfaces into a non-transitory storage medium to be used by a mapping routine (e.g., mapping the elements to the identified surfaces 340 of FIG. 3) to map the elements to particular surfaces. The non-transitory storage medium may include a data storage device such as the storage devices 130 or the local storage device 140. The identified surfaces may be stored in a particular table such as the table disclosed in FIG. 7 described below. In some embodiments, the identified surfaces may be stored in a transitory storage medium.

FIG. 7 shows an example of a table to store an inventory of surfaces identified from a user's local environment, according to some embodiments. Surfaces table 700 is an exemplary table that can store the results of the identifying surrounding surfaces process in a database. The surfaces table 700 includes, for example, information about surfaces within a user's physical environment 105 having data columns including surface ID 710, width 720, height 730, orientation 740, real or virtual indicator 750, multiple 760, and position 770. One of ordinary skill in the art may appreciate the surfaces table 700 may be a table in a relational database or in any type of database. Additionally, the surfaces table 700 may be an array in a computer memory (e.g., a cache) storing the results of the identifying surrounding surfaces at 330 of FIG. 3.

Each row of rows 780 in the surfaces table 700 may correspond to a surface from the user's physical environment 105 or a virtual surface that may be displayed to the user 108 within the user's physical environment 105. The surface ID 710 is a column containing a unique identifier to uniquely identify a particular surface (e.g., a surface ID). The dimensions of the particular surface are stored in the width 720 and height 730 columns.

The orientation 740 is a column indicating an orientation of the surface with respect to the user 108 (e.g., vertical, horizontal, etc.). The real/virtual 750 is a column indicating whether the particular surface is located on a real object within the user's physical environment 105 as perceived by the user 108 using the head-mounted system 160, or if the particular surface is located on a virtual object that will be generated by the head-mounted system 160 and displayed within the user's physical environment 105. The head-mounted system 160 may have to generate virtual objects for situations where the user's physical environment 105 may not contain enough surfaces to display an amount of content that the user 108 wishes to display. In these embodiments, the head-mounted system 160 may search from a database of existing virtual objects that may have appropriate surface dimensions to display certain types of elements identified for display. The database may be from the storage devices 130 or the local storage device 140.

The multiple 760 is a column indicating whether the surface/object is compatible with displaying multiple versions of an element (e.g., the element may be the secondary tab 250 of FIG. 2, wherein for a particular web browser 110, there may be more than one secondary (i.e., inactive) tab (e.g., one web page per tab). If the multiple 760 column has a value of "Multiple," such as the case for a fourth entry of the surface ID column storing a value of 190 corresponding to the virtual Rolodex 190 of FIG. 2, and a fifth entry of the surface ID column storing a value of 194 corresponding to the multi-stack virtual object 194 of FIG. 2), the system and method will know that if there is an element that may have multiple versions of the element, as is the case for inactive tabs, these are the types of surfaces that can accommodate the multiple versions.

The position 770 is a column indicating the position of the physical surface relative to a frame of reference or a reference point. The position of the physical surface may be pre-determined to be the center of the surface as shown in the column header of position 770 in FIG. 7. In other embodiments, the position may be pre-determined to be another reference point of the surface (e.g., the front, back, top or bottom of the surface). The position information may be represented as a vector and/or positional information from the center of the physical surface relative to some frame of reference or reference point. There may be several ways to represent position in the surface table 700. For example, the value of the position for surface ID 194 in surface table 700 is represented in the abstract to illustrate vector information and frame of reference information (e.g., the 'frame' subscript). The x,y,z are 3D coordinates in each spatial dimension and frame denotes which frame of reference the 3D coordinates are with respect to.

For example, surface ID 186 shows a position of the center of the surface 186 to be (1.3, 2.3, 1.3) with respect to a real world origin. As another example, surface ID 192 shows a position of the center of the surface 192 to be (x,y,z) with respect to a user frame of reference and surface ID 190 shows a position of the center of the surface 190 to be (x,y,z) with respect to another surface 182. The frame of reference is important to disambiguate which frame of reference is currently being used. In the case of a real world origin as the frame of reference, it is generally a static frame of reference. However, in other embodiments when the frame of reference is a user frame of reference, the user may be a moving reference frame, in which case, the plane (or vector information) may be moving and changing with the user if the user is moving and the user frame of reference is used as the frame of reference. In some embodiments, the frame of reference for each surface may be the same (e.g., user frame of reference). In other embodiments, the frame of reference for surfaces stored within a surface table 700 may be different, depending on surface (e.g., user frame of reference, world frame of reference, another surface or object in the room, etc.)

In the current example, the values stored within the surfaces table 700 contain physical surfaces (e.g., the vertical surfaces 182 and 186, and the horizontal surface 192) identified within the user's physical environment 105 of FIG. 2 and virtual surfaces (e.g., the virtual Rolodex 190 and the multi-stack virtual object 194). For example, in the current embodiment, a first entry of the surface ID 710 column stores a value of surface ID 182 corresponding to the vertical surface 182 of FIG. 2. A width value in the width 720 column and a height value in the height 730 column corresponding to the width and height of the vertical surface 182, respectively, indicate the vertical surface 182 has a dimension of 48" (W) by 36" (H). Similarly, an orientation value in the orientation 740 column indicates the vertical surface 182 has an orientation of "Vertical." Additionally, a real/virtual value in the real/virtual 750 column indicates the vertical surface 182 is a "R" (e.g., real) surface. A multiple value in the multiple 760 column indicates that vertical surface 182 is "Single" (e.g., can only hold a single content). Finally, a position 770 column indicates the position of the vertical surface 182 with respect to the user 108 with a vector information of $(2.5, 2.3, 1.2)_{user}$.

The remaining rows within the surfaces table 700 contain information for the remaining surfaces within the user's physical environment 105. One of ordinary skills in the art may appreciate that storing the results of the identifying surrounding surfaces at 330 of FIG. 3 improves the functioning of the computer itself because once this analysis has been performed on the surrounding surfaces, it may be retained by the head-mounted system 160 for future analysis of the user's surrounding surfaces if another user or the same user 108 is in the same physical environment 105 but interested in different 2D content. The processing steps for identifying surrounding surfaces at 330 may be avoided since these processing steps have already been completed before. The only differences may include identifying additional or different virtual objects to be available based at least in part on the elements table 500 identifying the elements with the different 2D content.

In some embodiments, the surfaces table 700 is stored in the storage devices 130. In other embodiments, the surfaces table 700 is stored in the local storage device 140 of the user 108 for quick access to recently viewed 2D content or for possible revisit to the recently viewed 2D content. Yet in other embodiments, the surfaces table 700 may be stored at both the storage devices 130 located remotely from the user 108 and the local storage device 140 located local to the user 108.

Figure 8:
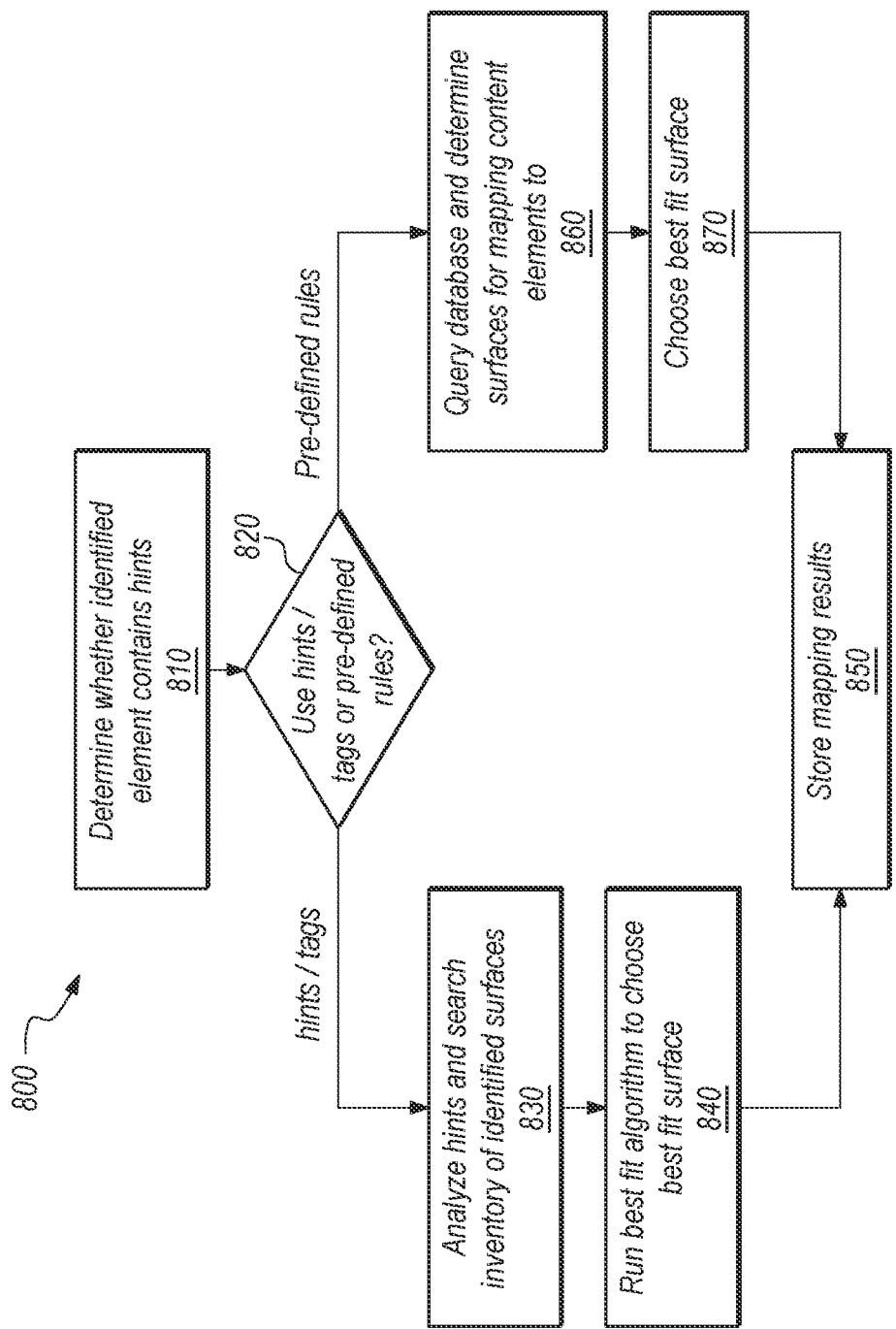
FIG. 8 is a flow diagram illustrating a method for mapping elements from a 2D content to available surfaces, according to some embodiments.

Returning to FIG. 3, the method continues with mapping elements to identified surfaces at 340 using a combination of the identified elements from the identifying elements in the 2D content 320 and the identified surrounding surfaces from the identifying surrounding surfaces at 330 and in some embodiments, using virtual objects as additional surfaces. Mapping the identified elements to the identified surfaces may involve multiple factors, some of which may include analyzing hints provided by a 2D content designer/author via HTML tag elements defined by the 2D content designer/author by using an HTML Page parser such as the example HTML Page parser discussed above. Other factors may include selecting from a pre-defined set of rules of how and where to map certain 2D content as provided by an AR browser, AR interface, and/or cloud storage. FIG. 8 provides a detailed flow of the mapping process of mapping one or more elements from the 2D content to identified surfaces.

FIG. 8 depicts a flow diagram illustrating a method for mapping elements from 2D content to surfaces, according to some embodiments. FIG. 8 is a detailed flow disclosing the mapping elements to identified surfaces at 340 of FIG. 3.

At 810, the method determines whether an identified element contains hints provided by the 2D content designer. The 2D content designer may provide hints as to where to best display a particular element when the 2D content designer originally designed the 2D content. For example, the main video 220 of FIG. 2 may be a YOUTUBE video displayed on a web page within the active tab 260. The 2D content designer (e.g., web page designer) may provide a hint to indicate that the main video 220 is best displayed on a flat vertical surface in the direct view of the user 108. In some embodiments, this may be accomplished by using existing HTML tag elements, originally designed for 2D web page content, to further define how a particular content element within the 2D content may be displayed if a 3D display environment is available. As another example, a 2D content designer may provide a hint that states that a 3D image is available instead of a 2D image for a particular web page. For example, in the case of the 2D image, the 2D content designer may, in addition to providing the basic HTML tags to identify the source of the 2D content, provide other infrequently used HTML tags to identify the source of a 3D version of the 2D image and in addition, provide a hint that if the 3D version of the image is used, to display it prominently in front of the user's view (e.g., in a main frame of a 3D layout). In some embodiments, the 2D content designer may provide this additional 'hint' to a 3D image location of the 2D image just in case the web browser 110 rendering the 2D content may have 3D displaying functionalities to leverage the enhanced 3D image. One skilled in the art may appreciate there are many other ways a 2D content designer may provide hints as to where a particular content element should be placed in a 2D layout other than what has been disclosed herein and that these are some examples of different ways a 2D content designer may provide hints to best display certain or all elements within a 2D content.

In another embodiment, the HTML tag standard may include new HTML tags or the creation of a similar mark-up language for providing hints of 3D object placement in a user's surrounding for AR/VR specific types of browsers such as the Example HTML Web Page provided by the web page developer discussed above. As of this writing, these new HTML tags have not yet been created and/or adopted as standard tags within the HTML language. However, once the HTML standard includes these types of additional tags, certain embodiments of the current methods and systems will leverage these new tags to further provide a mapping of the identified elements to identified surfaces. One skilled in the art may appreciate there are many other languages other than HTML tags that may be modified or adopted to further provide hints for how content elements should best be displayed in a 3D environment and that new HTML tagging standards is just one way to achieve such a goal.

At 820, the method determines whether to use hints provided by the 2D content designer or to use pre-defined sets of rules to map the one or more content elements from the 2D content to certain types of 3D surfaces. In some embodiments, where there are no hints provided by the 2D content designer for a particular content element, the system and method may determine, using the pre-defined sets of rules, the best way to map the content element to the surfaces. In other embodiments, even when there may be hints for placement of the content element provided by the 2D content designer, the system and method may also determine that it may be best to use the pre-defined sets of rules to map the content elements to the surfaces. However, in other embodiments, the system and method may determine that the hints provided by the 2D content designer are sufficient and thus use the hints to map the content elements to the surfaces. In the end, it is the ultimate decision of the AR browser that determines whether to use hints provided by the 2D content designer or to use pre-defined rules to map content elements to surfaces.

At 830, assuming it was determined that using the hints provided by the 2D content designer is the way to proceed, the method analyzes the hints and searches the inventory of identified surrounding surfaces that may be used to display the particular content element based at least in part on the hint (e.g., querying the surfaces table 700). At 840, the method runs a best-fit algorithm to choose a best-fit surface for the particular content element based on the provided hint. The best-fit algorithm, for example, may take a hint of "main content" for a particular content element within the particular web page and try to identify a 3D surface from among the available identified surrounding surfaces that is front and center with respect to the user 108 in the 3D environment. For example, the main video 220 of FIG. 2 is mapped to the vertical surface 182 because the main video 220 has a preference value of "Main" in the preference 520 column of the elements table 500 of FIG. 5 within the active tab 260 and the vertical surface 182 is the surface that is in the direct vision of the user 108 and has an optimal sized dimension to display a main video 220.

At 850, the method stores the mapping results for the content elements in a mapping of elements to surfaces table in a non-transitory storage medium to be used by a display algorithm to display the content elements onto their respectively mapped surfaces, whether the surfaces are the identified surrounding surfaces or virtual objects displayed in the user's surrounding environment. The non-transitory storage medium may include a data storage device such as the storage devices 130 or the local storage device 140. The mapping results may be stored in a particular table such as the table disclosed in FIG. 9, described below.

FIG. 9 shows an example of a table to store the mapping of content elements from a 2D content to surfaces, according to some embodiments. Mapping table 900 is an exemplary table that stores results of the content elements mapped to surfaces process into a database. The mapping table 900 includes, for example, information about the content element (e.g., element ID) and the surface that the content element is mapped to (e.g., surface ID). One of ordinary skill in the art may appreciate the mapping table 900 may be a table stored in a relational database or in any type of database or storage medium. Additionally, the mapping table 900 may be an array in a computer memory (e.g., a cache) containing the results of the mapping of elements to identified surrounding surfaces at 340 of FIG. 3.

Each row of the mapping table 900 corresponds to a content element from the 2D content mapped to a surface either in the user's physical environment 105 or a virtual object that is displayed to the user 108, wherein the virtual object appears to be an object in the user's physical environment 105. For example, in the current embodiment, a first entry of the element ID column stores a value of element ID 220 corresponding to the main video 220. A surface ID value in the surface ID column corresponding to the main video 220 is 182 corresponding to the vertical surface 182. In this manner, the main video 220 is mapped to the vertical surface 182 Similarly, the user comments 230 are mapped to the horizontal surface 192, the suggested videos 240 are mapped to the vertical surface 186, and the secondary tab 250 is mapped to the virtual Rolodex 190. The element IDs in the mapping table 900 may be associated to element IDs stored in the elements table 500 of FIG. 5. The surface IDs in the mapping table 900 may be associated to surface IDs stored in the surfaces table 700 of FIG. 7.

Returning to FIG. 8, at 860, assuming it was determined that using the predefined rules is the way to proceed, the method queries a database containing mapping rules of content elements to surfaces and determines for a particular content element within a web page, which types of surfaces should be considered for mapping the content element. For example, the rules returned for the main video 220 from FIG. 2 may indicate that main video 220 should be mapped to vertical surfaces, and thus after searching the surfaces table 700, multiple candidate surfaces are revealed (e.g., the vertical surfaces 182 and 186, and the virtual Rolodex 190). At 870, the pre-defined sets of rules may run a best-fit algorithm to choose from the available candidate surfaces, which surface is the best fit for this main video 220. Based at least in part on the best-fit algorithm, it is determined that the main video 220 should be mapped to the vertical surface 182 because of all of the candidate surfaces, the vertical surface 182 is a surface that is in the direct line of sight of the user 108 and the vertical surface 182 has the best dimension for displaying a video. Once the mapping of the one or more elements is determined, at 850 the method stores the mapping results for the content elements in a mapping of elements to surfaces table in a non-transitory storage medium as described above.

Returning to FIG. 3, the method continues with displaying the one or more elements as virtual content onto mapped surfaces at 350. The head-mounted system 160 may include one or more display devices within the head-mounted system 160 such as mini projectors (not shown) to display information. The one or more elements are displayed onto the respective mapped surfaces as mapped at 340. Using the head-mounted system 160, the user 108 will see the content on the respective mapped surfaces. One of ordinarily skill in the art may appreciate the content elements are displayed to appear to be physically attached on the various surfaces (physical or virtual) but in actuality, the content elements are actually projected onto the physical surfaces as perceived by the user 108 and in the cases of virtual objects, the virtual objects are displayed to appear to be attached on the respective surfaces of the virtual objects. One of ordinarily skill in the art may appreciate that when the user 108 turns their head or looks up or down, the display devices within the head-mounted system 160 may continue to keep the content elements affixed to their respective surfaces to further provide the perception to the user 108 that the content are affixed to the mapped surfaces. In other embodiments, the user 108 may change the content of the user's physical environment 105 by a motion made by head, hands, eyes or voice of the user 108.

Physical Manipulation of Objects

Some embodiments of the invention are directed to an approach to provide creation, physical navigation, and manipulation of objects. Unlike known computing systems that limit the scope of interaction with users to only representations of objects displayed in 2D space with the use of conventional mouse/keyboard type interactions to manipulate objects, the present embodiment pertains to interactions by users in 3D space that allows physical interactions with the computing system. This permits users to utilize physical movements and gestures to control the movement and placement of objects in the interactive environment.

Figure 10A:
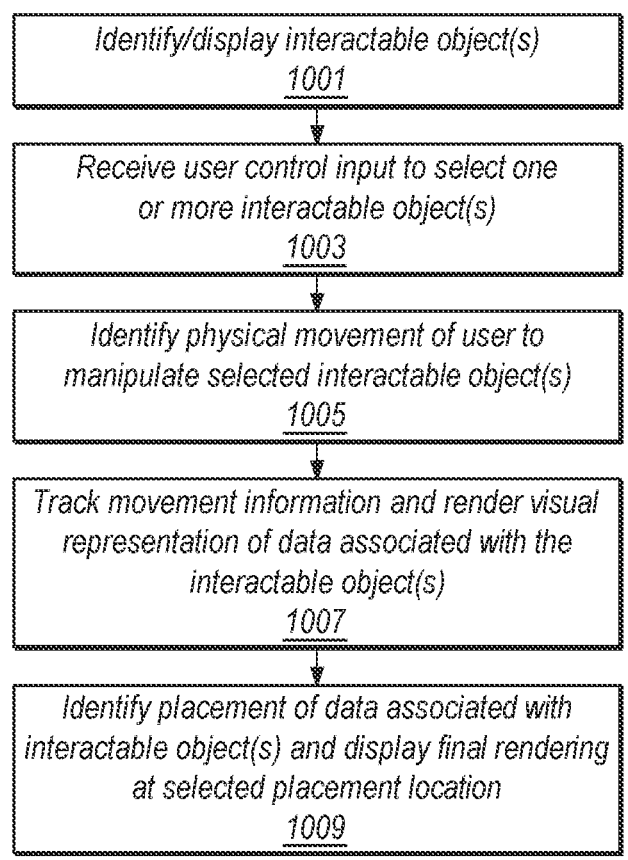
FIG. 10A shows a flowchart of an approach to implement physical placement and manipulation of data associated with interactable objects.

FIG. 10A shows a flowchart of an approach to implement physical placement and manipulation of objects according to some embodiments. At 1001, one or more interactable objects are identified and presented to the user through the display device of the mixed reality system for a host application. The interactable objects may include both real objects and virtual objects. The virtual objects are objects that only exist as constructs within the virtualized universe and are generated/displayed as computer-generated renderings to the user through a head-mounted display device. The real objects may be displayed either as digital computer generated display object renderings that corresponds to the real object (e.g., for a VR application) or viewable as the real object itself through a transparent portion of the display device (e.g., for an AR application). In some embodiments, interactable objects may be real or virtual objects that cause a change in the HMD system when an interaction is detected between the interactable object and the user or the HMD system.

At 1003, a user control input is received to select one or more of the interactable objects. This selection may be facilitated by using a controller device (such as a mouse or haptics controller) to hover a pointer object, where triggering of a button or trigger identifies the user's desire to select the object(s) that the pointer is currently hovering over. The object hovered over by the pointer may be a selectable link/URL that corresponds to source data for the interactable object. Alternatively, selection may occur with only physical movements/gestures by the user—without the need for a user to manipulate a control device. For example, the mixed reality system may employ one or more camera devices that track the movements of a user's hand/arm, and can therefore identify when the user's hand is hovering over an interactable object/link. Certain gestures may be pre-configured within the system to be recognized as a "selection" gesture (e.g., a double-shake of the hand when the hand is configured in a selection position such as when the user's hand is held with a pointer finger pointed over/at an object). Therefore, when the selection gesture is recognized while the user's hand is hovered over an interactable object, that object will be recognized by the system as being selected by the user. Other embodiments of selection gestures are described below in connection with "release" gestures.

At 1005, the mixed reality system identifies and tracks a physical movement of the user with respect to the selected object. For example, while the user has selected an object at a first location, the user may desire to move that object to a second location. With the present embodiment, that movement of the object to the second location may be implemented by physical movement of the user from the first location to the second location. This may occur, for example, by movement of the user's selection arm from the first location to the second location and/or where the user walks to a second physical location. The physical movement of the user may be recognized and tracked by identifying any changes of position for a controller device that is being held by the user, e.g., by tracking the physical movement of a haptics controller held by the user via positional changes of any sensors/emitters that may be embedded within the controller device and/or visually tracking movement of any markers on the controller device. Alternatively, the physical movement of the user may be recognized and tracked by identifying physical movement of relevant portion(s) of the user's physical body, e.g., where a camera device visually tracks the movement and location of the user's selection arm/hand.

While the user is engaged in the physical movement, at 1007, the data associated with the interactable object(s) are correspondingly displayed into new positions/locations that correlate to the user's movements. For example, if the user has selected an object with a selection arm and is currently moving the selection arm from a first location to a new location, the data associated with the interactable object (i.e. selected object) will be visually displayed in the second location that corresponds to the movement of the user's arm. For efficiency purposes, some embodiments may only display a thumbnail display and/or low-resolution preview of the data associated with the interactable object during any ongoing movements, with a high-resolution display version being implemented only upon final placement of the object.

The object may be rendered into a bounded volume hereinafter referred to as a "Prism." Each Prism may have characteristics and properties that allow a universe application to manage and display the Prism in the VR/AR environment such that the universe application may manage the placement and display of the virtual content in the VR/AR environment by managing the Prism itself. In some embodiments, the Prism is implemented as a cubic and/or rectangular volume of space that virtual content from an application is displayed into, wherein the application is an application instance of the application when the application renders into more than one Prism. A Prism may represent a sub-tree of a multi-application scene graph for the current location. Retrieving the one or more Prisms previously deployed at the current location comprises retrieving instance data for the one or more Prisms from an external database, and reconstructing a local Prism database with the instance data for the one or more Prisms, wherein the instance data for each Prism include a data structure of Prism properties defining the Prism, the Prism properties comprising at least one of a location, an orientation, an extent width, an extent height, an extent depth, an anchor type, or an anchor position, wherein the instance data for each Prism include key value pairs of application specific properties comprising state information of virtual content previously rendered into the Prism by an application. Further details regarding an approach to implement prisms is described in U.S. Application Ser. No. 62/610,101, entitled "METHODS AND SYSTEM FOR MANAGING AND DISPLAYING VIRTUAL CONTENT IN AN AUGMENTED REALITY SYSTEM," filed on Dec. 22, 2017, which is hereby incorporated by reference in its entirety.

When the user makes a recognizable physical movement while selecting an interactable object, a new Prism is created that holds the data corresponding to the interactable object, and is moved to a new location to implement the movement of the data corresponding to the interactable object. The coordinate location of the Prism for the selected object(s) is modified within the universe application to represent the new location of the selected object, where the appropriate properties of the prism (such as location properties) are modified to represent the new location coordinates.

Other properties of the object may also need to be modified to represent the new positioning of the object. For example, the orientation of the object may change in the new location at which the object is to be displayed. Warping may be applied to modify the displayed orientation of the object in the new display location. To the extent unacceptable video artifacts may occur as a result of the warping (e.g., where the warping excessively distorts the displayed object image and/or the warping results in excessive amounts of object data for the new orientation that cannot be displayed), then a re-rendering may occur to render the object for display in the new location.

Any suitable approach may be taken to determine an orientation for the data associated with the interactable object. For example, in some embodiments, the orientation of the data associated with the interactable object may be a surface normal of a substantially planar content, or the orientation may be pre-defined and correlated to the data associated with the interactable object to indicate the preferred direction the host application intended the content be viewed. As an example, an avatar would have an orientation vector with a surface normal from the point in between the avatar's eyes. The orientation may also be determined in any other suitable way that may be applied.

At some point, the user may seek to implement final placement of the selected object at a new location. This may be recognized, for example, e.g., by identifying when the user releases the selection button/trigger on a controller device. In addition, even when a controller device is not used, a "release gesture" may be pre-configured and recognized by the mixed-reality system to identify the location for placement of the object by identifying the user making the appropriate gesture. At 1009, the placement of the selected object is recognized, and a final rendering of the data associated with the selectable object is then made at that new location.

In some embodiments, the start of a release gesture may be the same as the end of a selection gesture. For example, a user's hand may start in an open position and close into a pinch (e.g., the selection gesture), and the user input may continue starting with the same pinch and open into an open position (e.g., the release gesture). As such, a single user input/interaction may be used to select (i.e., the selection gesture) and release (i.e., the continuous release gesture) an interactable object. In some embodiments, the user may pinch (e.g. start with an open hand and move fingers so the tips of the fingers touch) a selectable object, such as a URL link, drag the URL link outside of the browser window and release the URL (e.g. by reversing the pinch movement), which may be considered a single user interaction. In other embodiments, a first pinch may be used to select a virtual object and a second pinch may be used to release the interactable object.

By way of an illustrative embodiment, this disclosure will now describe window creation for a browser with physical navigation. To explain, consider that in mixed reality systems, a user's workspace is not limited by the size of a display screen. Therefore, unlike conventional browsers, the browser window in a mixed reality system can be placed and retained anywhere within the user's environment. The problem is that conventional browser technologies are configured with the assumption that a displayable browser location must be limited to the confines of a display screen.

To address this limitation of conventional browsers, some embodiments of the invention are directed to an approach to provide physical navigation and manipulation of browser windows. The general idea is that a user of the mixed reality system is provided the ability to place the browser window to any eligible location in the user's environment, where placement of that window is achieved by physical manipulation activities of the user.

Figure 10B:
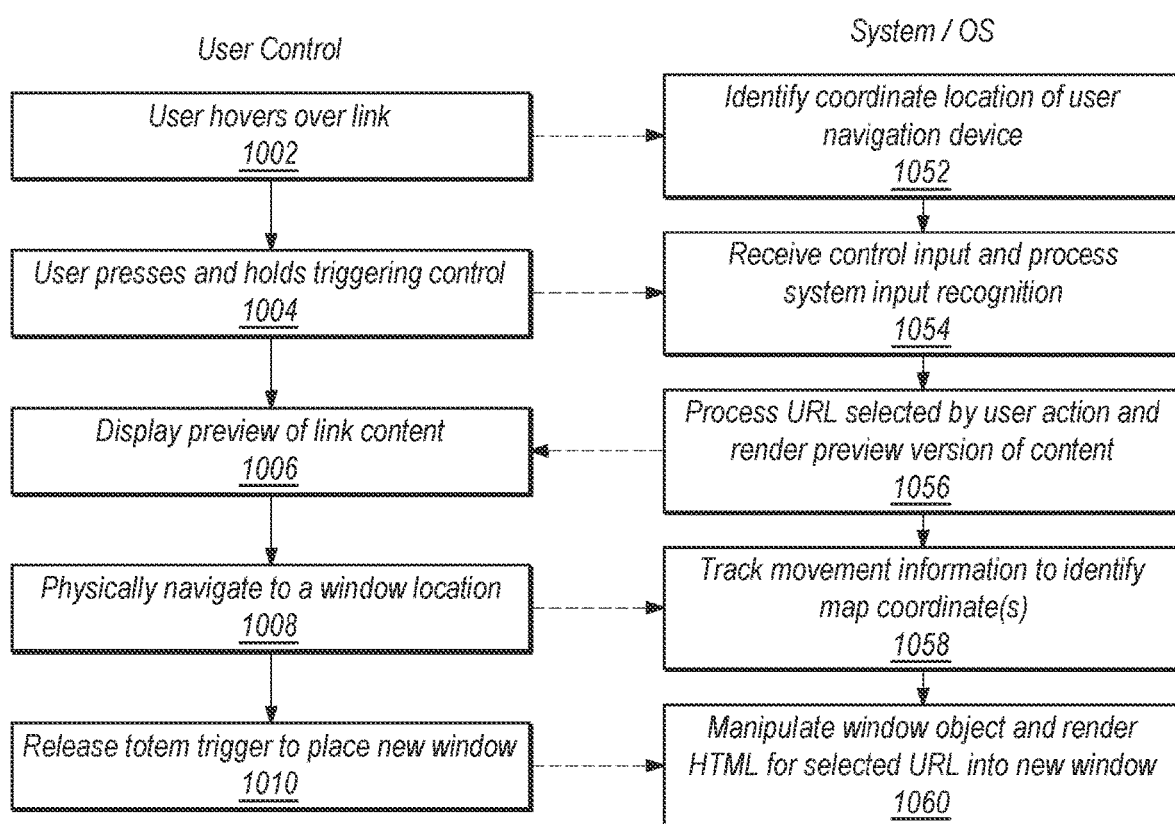
FIG. 10B shows a flowchart of an approach to implement physical placement and manipulation of browser windows.

FIG. 10B shows a flowchart of an approach to implement physical placement and manipulation of browser windows. At 1002, the user manipulates a pointing object (such as a cursor/pointer) to hover over a link on a browser window. Within the underlying computing system/OS that implements the browser, the position of the pointer object is tracked and identified (1052). This may occur, for example, by tracking and reviewing one or more event objects within the system, where the event objects pertain to movement events for the mouse pointer. The mouse/cursor position may be reported on the event object and received by a handler which is attached to the window.

At 1004, the user presses and holds a trigger control using a manipulation control mechanism. For example, a haptics controller implemented as a totem may be employed to allow the user to press and hold a trigger over the link. A totem is a hand-held controller that tracks its position and orientation relative to an AR/VR headset. In some embodiments, the totem may be a six degree-of-freedom (six DOF) controller where a user may move a pointer around in altitude and azimuth (on a spherical shell) by moving the totem up or down. To move the object closer or farther away, the user may use the joystick on the totem to "push" or "pull". At 1054, the underlying OS receives the event object indicating the triggering event that has occurred.

A preview may be generated of the link contents at 1006. In some embodiments, this is performed (at 1056) by accessing the URL associated with the link for which the triggering was detected. The URL is parsed to identify the location (e.g., web site), from which a location identifier (e.g., IP address) is identified for that location. A connection (e.g., a TCP connection) is then established, where communications with the HTTP server is performed to identify content that is then rendered. In the current embodiment, the content rendering is performed on a preview basis so that a "thumbnail" based rendering is generated of the link content.

While continuing to hold the totem trigger, the user performs physical navigation (e.g., hand, arm and body movements) to point the totem to the desired new window location. This results in physical navigation of the window location (1008). The physical movements may be translated into event objects generated by and/or pertaining to the operation of the totem device, which correlates to data for the movement and/or positioning of totem (1058). This movement/positioning that is detected for the user's physical movement is applied to a movement/positioning of the preview window, with the dynamic positioning of the preview window being displayed to the user in correspondence to the user's physical movements.

At 1010, the user then releases the totem trigger at the desired location to place the window. At this point, at 1060, the browser window is created at the coordinates corresponding to the location at which the totem trigger was released. In accordance with some embodiments, instead of managing browser windows in a VR/AR environment on a one-on-one basis independently by each application, the window is instead rendered into a Prism.

Figure 11A:
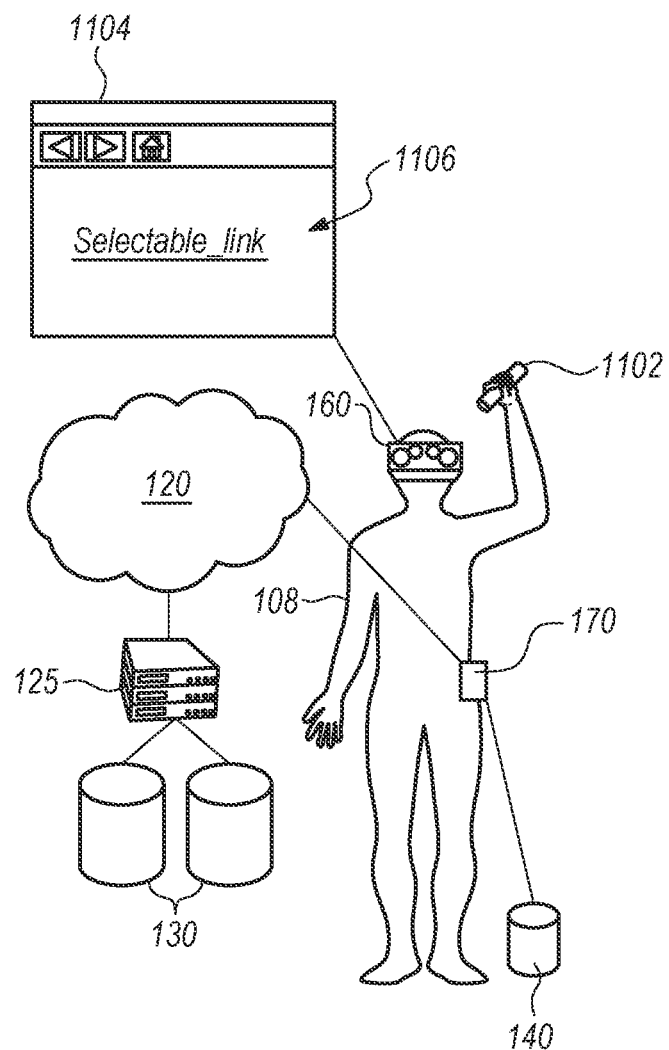
FIGS. 11A-F provide an illustrated example of an approach to physically place windows in a mixed realty environment.

FIGS. 11A-F provide an illustrated example of this approach to physically place windows in a mixed realty environment. FIG. 11A shows a representation of a mixed realty environment, which includes a physical environment as viewed by a user 108 through a head-mounted system 160. Content (e.g., a web page) can be viewed through a web browser 1104 that is accessed through a network 120. The content shown in the browser 1104 may include one or more selectable links 1106.

The network 120 may be the Internet, an internal network, a private cloud network, a public cloud network, etc. The web browser 1104 is also operably coupled to a processor 170 via the network 120. Although the processor 170 is shown as an isolated component separate from the head-mounted system 160, in an alternate embodiment, the processor 170 may be integrated with one or more components of the head-mounted system 160, and/or may be integrated into other system components within the environment 100 such as, for example, the network 120 to access a computing network 125 and storage devices 130. The processor 170 may be configured with software for receiving and processing information such as video, audio and content received from the head-mounted system 160, a local storage device 140, the web browser 1104, the computing network 125, and the storage devices 130.

The head-mounted system 160 may be a virtual reality (VR) or augmented reality (AR) head-mounted system that includes a user interface, a user-sensing system, an environment sensing system, and a processor (all not shown). The head-mounted system 160 presents to the user 108 an interface for interacting with and experiencing a digital world. Such interaction may involve the user and the digital world, one or more other users interfacing the environment 100, and objects within the digital and physical world.

The user interface may include receiving 2D content and selecting elements within the 2D content by user input through the user interface. The user interface may be at least one or a combination of a haptics interface devices, a keyboard, a mouse, a joystick, a motion capture controller, an optical tracking device and an audio input device. A haptics interface device, such as totem 1102, is a device that allows a human to interact with a computer through bodily sensations and movements. Haptics refers to a type of human-computer interaction technology that encompasses tactile feedback or other bodily sensations to perform actions or processes on a computing device.

The user-sensing system may include one or more sensors operable to detect certain features, characteristics, or information related to the user 108 wearing the head-mounted system 160. For example, in some embodiments, the sensors may include a camera or optical detection/scanning circuitry capable of detecting real-time optical characteristics/measurements of the user 108 such as, for example, one or more of the following: pupil constriction/dilation, angular measurement/positioning of each pupil, spherocity, eye shape (as eye shape changes over time) and other anatomic data. This data may provide, or be used to calculate information (e.g., the user's visual focal point) that may be used by the head-mounted system 160 to enhance the user's viewing experience. The environment-sensing system may also include one or more sensors for obtaining data from the user's physical environment. Objects or information detected by the sensors may be provided as input to the head-mounted system 160. In some embodiments, this input may represent user interaction with the virtual world.

Figure 11B:
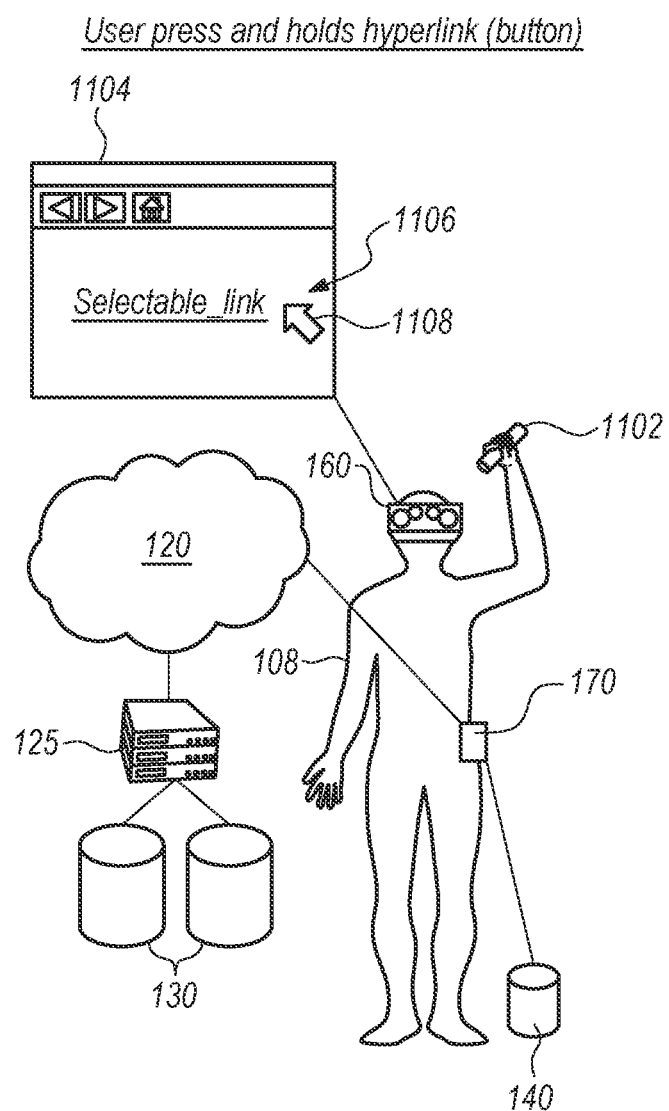

As illustrated in FIG. 11B, the user may press and hold upon the selectable link 1106 within the browser 1104. A pointer 1108 controllable by the user 108 may be employed to hover over the selectable link 1108. When the user is hovering over the link, the user may then press and hold a trigger on totem 1102.

Figure 11C:
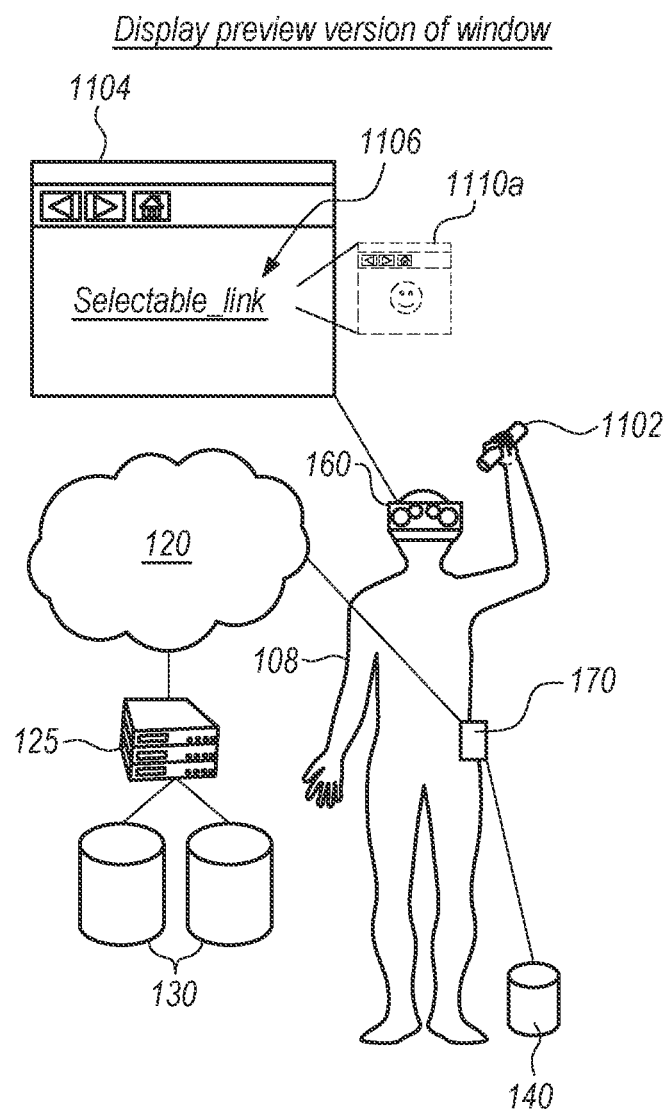

As shown in FIG. 11C, when the user press and holds the totem trigger, a preview window 1110a is displayed to the user. The preview window 1110a corresponds to content pertaining to the link 1106.

Figure 11D:
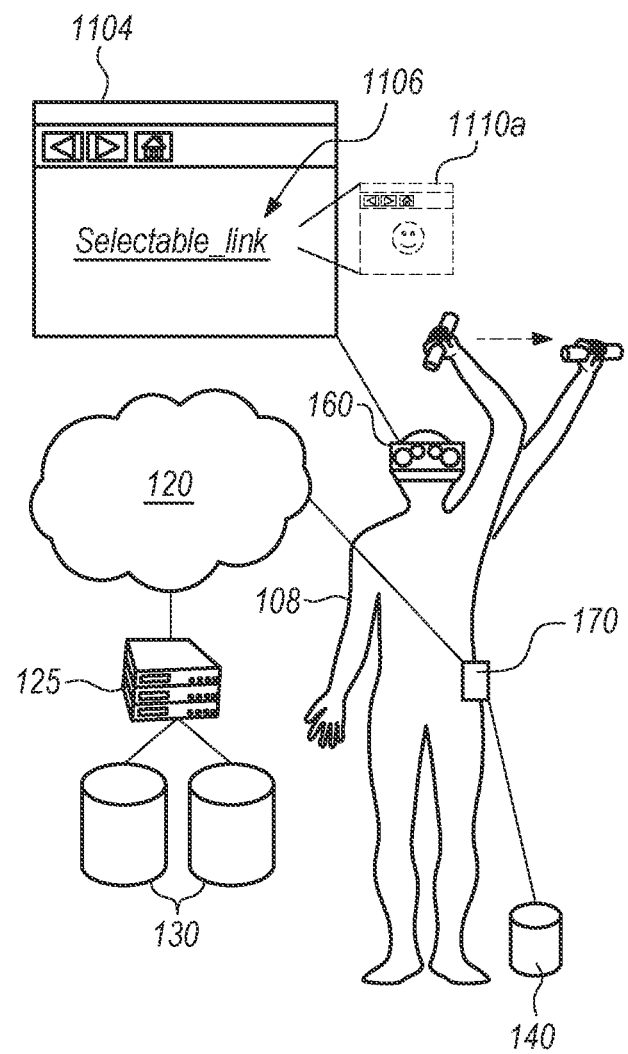
Figure 11E:
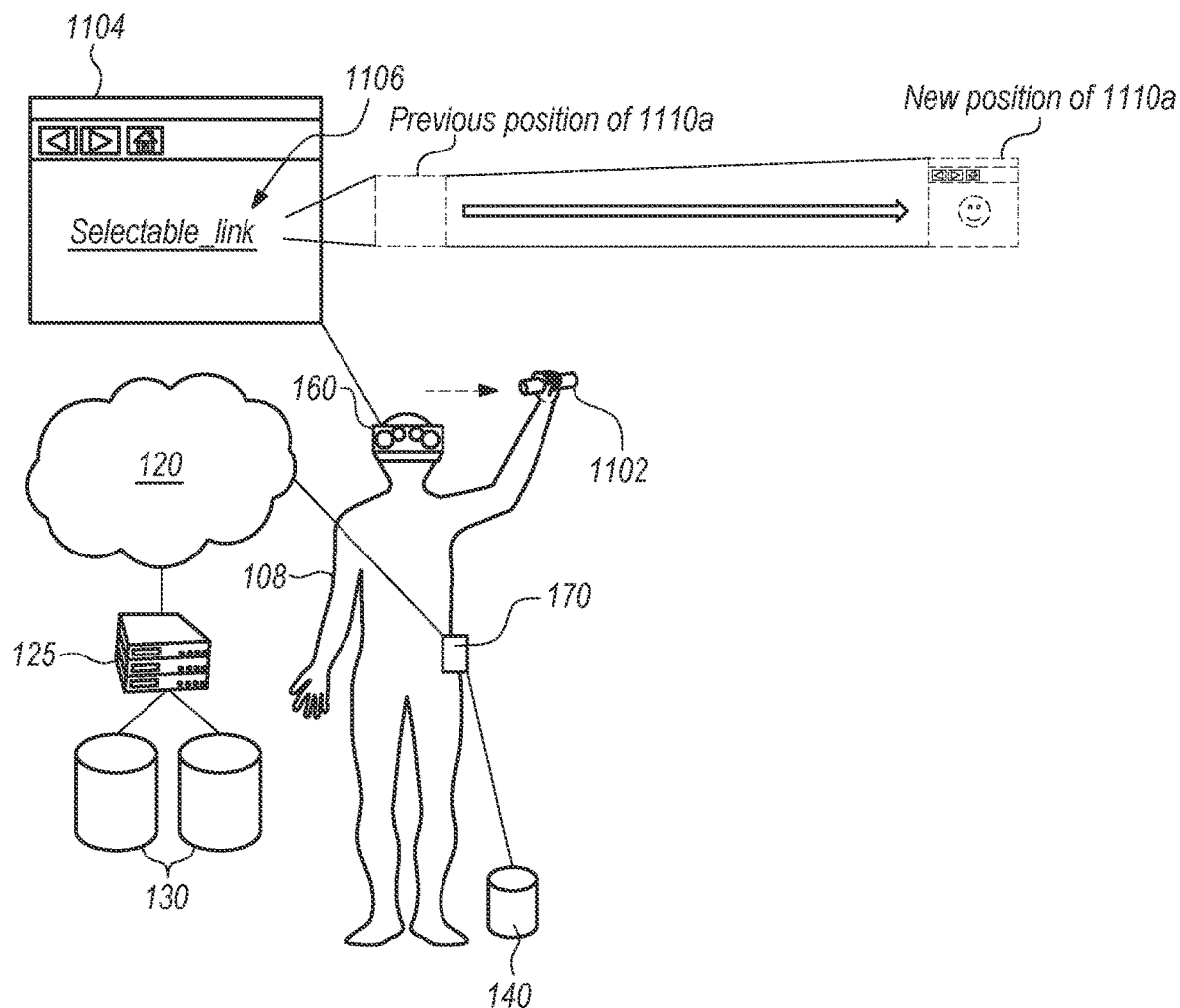

The preview window 1110a can be manipulated by the user 108 in a physical manner to change the displayed location of the preview window 1110a. For example, while continuing to hold the totem trigger, the user can physically move a portion of his/her body, e.g., by moving the arm holding the totem to a new location/position as shown in FIG. 11D. As illustrated in FIG. 11E, the physical movement of the user's body changes the location of the preview window 1110a. This may be accomplished, for example, by detecting a change in position/orientation of the totem 1102 that is held in the moved body portion (e.g., detection of movement of the totem that is held in the user's hand), where detection of that physical movement is translated into a corresponding movement of the preview window. As such, display of the new position of the preview window (as well as the window display while in motion) can be controlled by, for example, the speed of physical movement of the user, distance of physical movement, direction of physical movement, and/or any other suitable window/display parameters that may correspond to the physical movement. For example, a relatively small displacement in the arm position would be translated into a relatively small movement of the displayed preview window, while moving the arm for a relatively larger distance would be translated to a relatively larger movement of the display window position. As another example, slower movement of the arm would be translated into a slower displayed movement of the preview window while in motion, while moving the arm relatively faster would be translated to a relatively faster movement of the preview window while in motion.

Figure 11F:
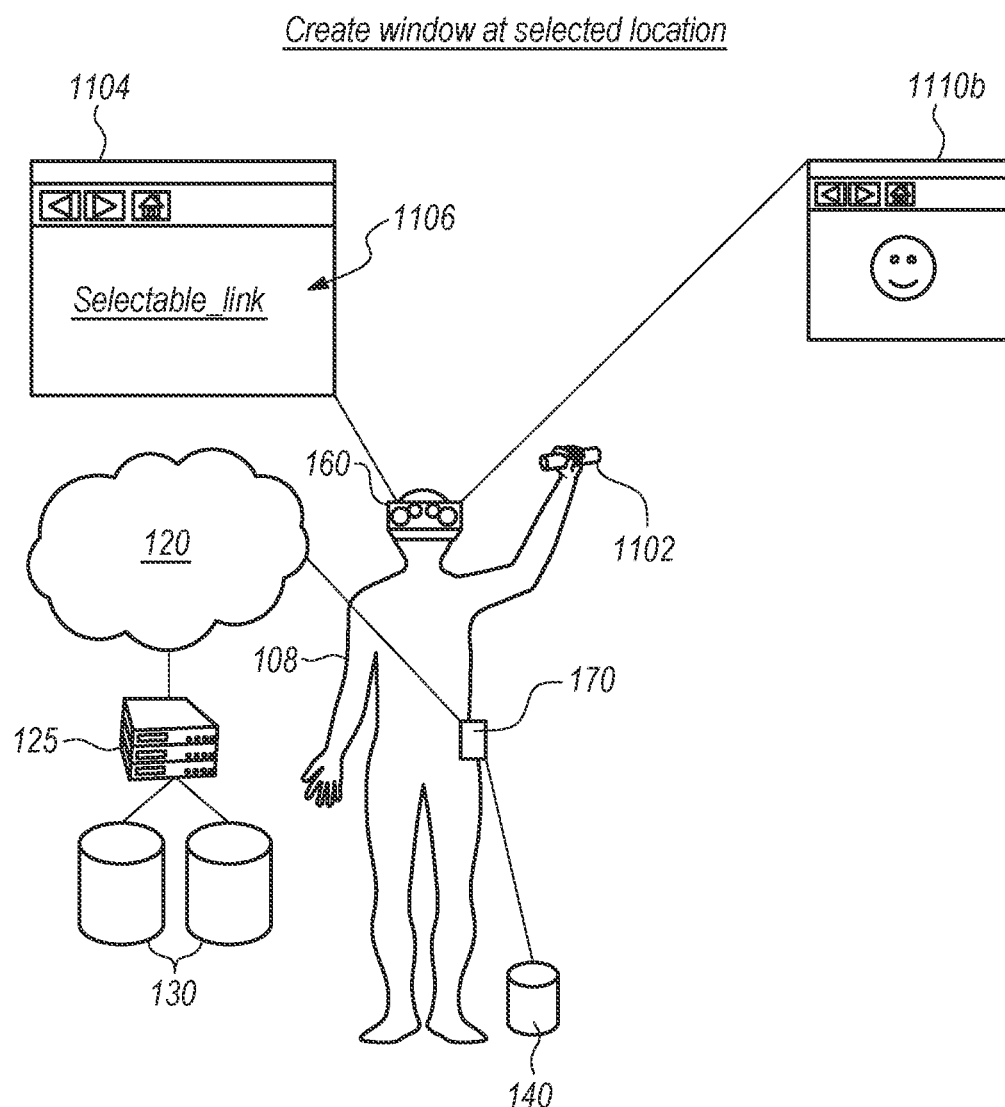

The user can then choose the location at which the browser window is to be placed. As illustrated in FIG. 11F, when the user releases the totem trigger, the location of the preview window at the time of release of the totem trigger becomes the location of the new browser window to be created.

Therefore, the current embodiment provides an approach to select a link, move it to a new location and releasing the object to create a new window that permits users to place, organize and save content within their physical environment. Unlike conventional desktop and mobile environments, this placement is via physical navigation, allowing the user to use their hand, arm, and/or body to move content around the user's space. This form of navigation is much more efficient than virtual navigation used by desktop and mobile browsers and gives users more control over the creation and placement of browser windows within their space.

As described above, this approach is also advantageous because it allows a user to both open and place a new window with one user interaction (e.g., only one push of the button). This is a significant improvement over other inter-action approaches that require the user to first push a button to open a new window, then push a button to move/place the new window to a second location.

As another illustrative embodiment, this disclosure will now describe placement of any interactable object using physical manipulation. The specific illustrative embodiment pertains to placement of a wall hanging object, such as a painting, virtual television, virtual monitor, or any other object that can be placed onto a wall location. This example situation relates to the idea that a user may have a set of wall hangings/pictures that the user would like to hang up on walls throughout a house, but the user may not exactly know where to put them. The system would therefore create digital copies of the picture/painting in a wall hangings application that can be physically manipulated by the user to a placement location on a wall.

Figure 10C:
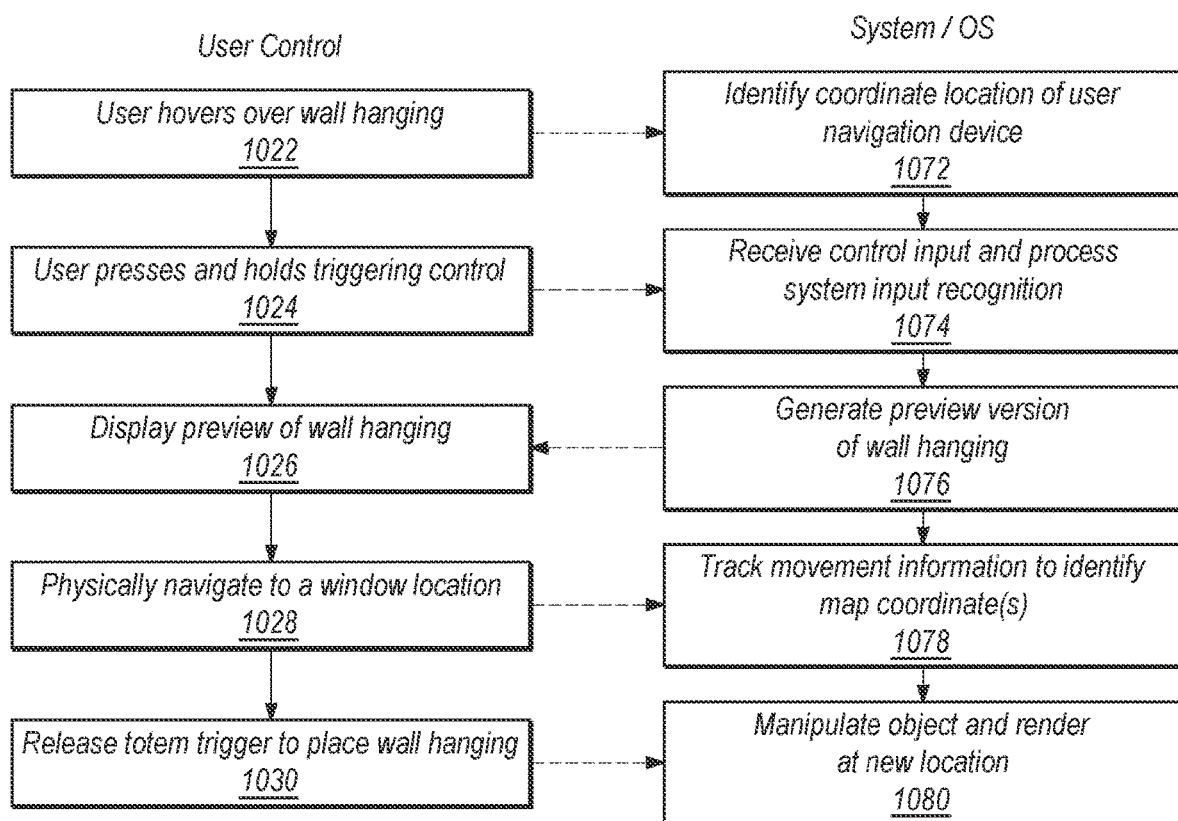
FIG. 10C shows a flowchart of an approach to implement physical placement and manipulation of wall hangings.

FIG. 10C shows a flowchart of an approach to implement physical placement and manipulation of wall objects according to some embodiments. At 1022, the user manipulates a user selection object (such as a cursor/pointer) to hover over interactable content (such as a wall object representation (icon) or a link to a wall object), on a host application, such as a browser window. Within the underlying computing system/OS that implements the host application, the position of the user selection object is tracked and identified (1072). This may occur, for example, by tracking and reviewing one or more event objects within the system, where the event objects pertain to movement events of the user selection object. The user selection object position may be reported on the event object and received by a handler which is attached to the host application.

At 1024, the user presses and holds a manipulation control mechanism, such as a trigger on a totem. For example, a haptics controller implemented as a totem may be employed to allow the user to press and hold a trigger to select a link, or other interactable content, such as files, application content, etc., such that when the interactable content is manipulated, additional data is accessed compared to before the manipulation occurred. At 1074, the underlying OS receives the event object indicating the manipulation control mechanism event (such as pressing or holding a totem trigger) has occurred. A manipulation control mechanism event may indicate the selection of an interactable object, or the manipulation of a selected interactable object.

A preview may be generated for the data associated with the interactable object at 1026. In some embodiments, this is performed (at 1076) by accessing the data associated with the interactable object, such as a URL associated with the link for which the manipulation control mechanism was detected. In some embodiments, the interactable object data is parsed to identify the location (e.g., web site), from which a location identifier (e.g., IP address) is identified for that location. A connection (e.g., a TCP connection) is then established, where communications with the HTTP server is performed to identify content that is then rendered. In some embodiments, the content rendering is performed on a preview basis so that a digital outline of the wall hanging is generated as the preview.

While continuing to activate the manipulation control mechanism, the user performs physical navigation (e.g., hand, arm and/or body movements) to point the user selection object to the desired wall location for the data associated with the interactable object. In some embodiments, this may result in physical navigation of the object location (1028). The physical movements are translated into event objects generated by and/or pertaining to the operation of the totem device, which correlates to data for the movement and/or positioning of totem (1078). This movement/positioning that is detected for the user's physical movement is applied to a movement/positioning of the preview wall hanging, with the dynamic positioning of the preview wall hanging being displayed to the user in correspondence to the user's physical movements.

At 1030, the user then releases the totem trigger at the desired location to place the data associated with the interactable object at the desired wall location. At this point, at 1080, the final version of the interactable object is created at the coordinates corresponding to the location at which the totem trigger was released. The full digital copy of the wall hanging (e.g., located at the source URL) is used to generate the final rendering of the interactable object at the placement location.

FIGS. 12A-F provide an illustrated example of this approach to physically place wall hangings in a mixed reality environment. This figure shows a representation of a mixed reality environment, which includes a physical environment as viewed by a user 108 through a head-mounted system 160. The user may be located in various locations that include wall space 105 for which wall hanging objects may be placed. Content (e.g., interactable objects/wall hangings) can be accessed, e.g., through one or more icons/selectable links/icons 1106.

As illustrated in FIG. 12B, the user may press and hold upon the interactable object 1106, e.g., where a controller operated by the user 108 may be employed to hover over the interactable object 1106. When the user is hovering over the object, the user may then press and hold a trigger on the controller to select the object.

As shown in FIG. 12C, when the user press and holds the controller trigger, a preview 1202 of the wall hanging object is displayed to the user. The preview 1202 corresponds to a digital outline and/or thumbnail of the wall hanging located at the link 1106, and is a visual representation of the data associated with the interactable object.

Figure 12A:
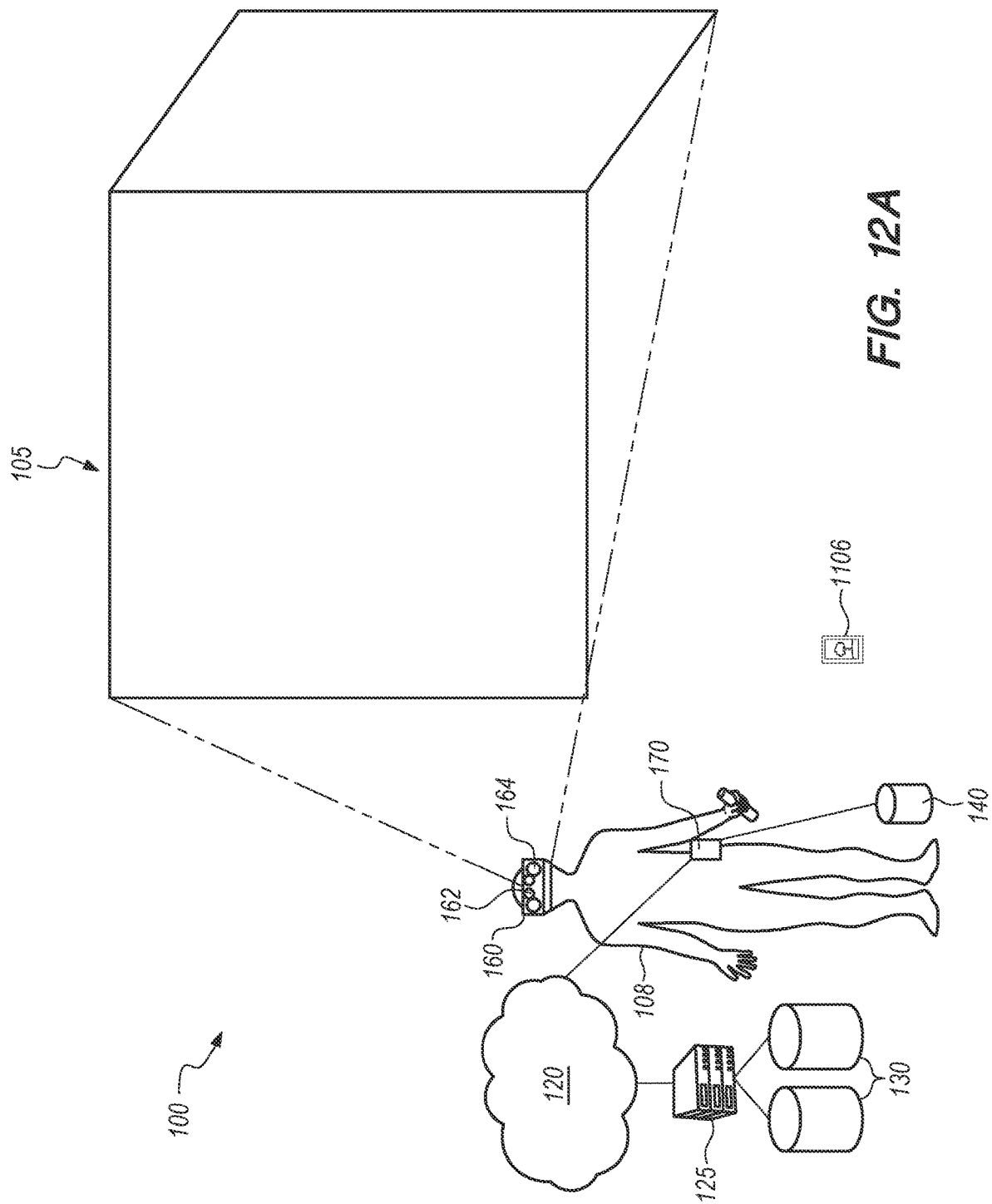
Figure 12D:
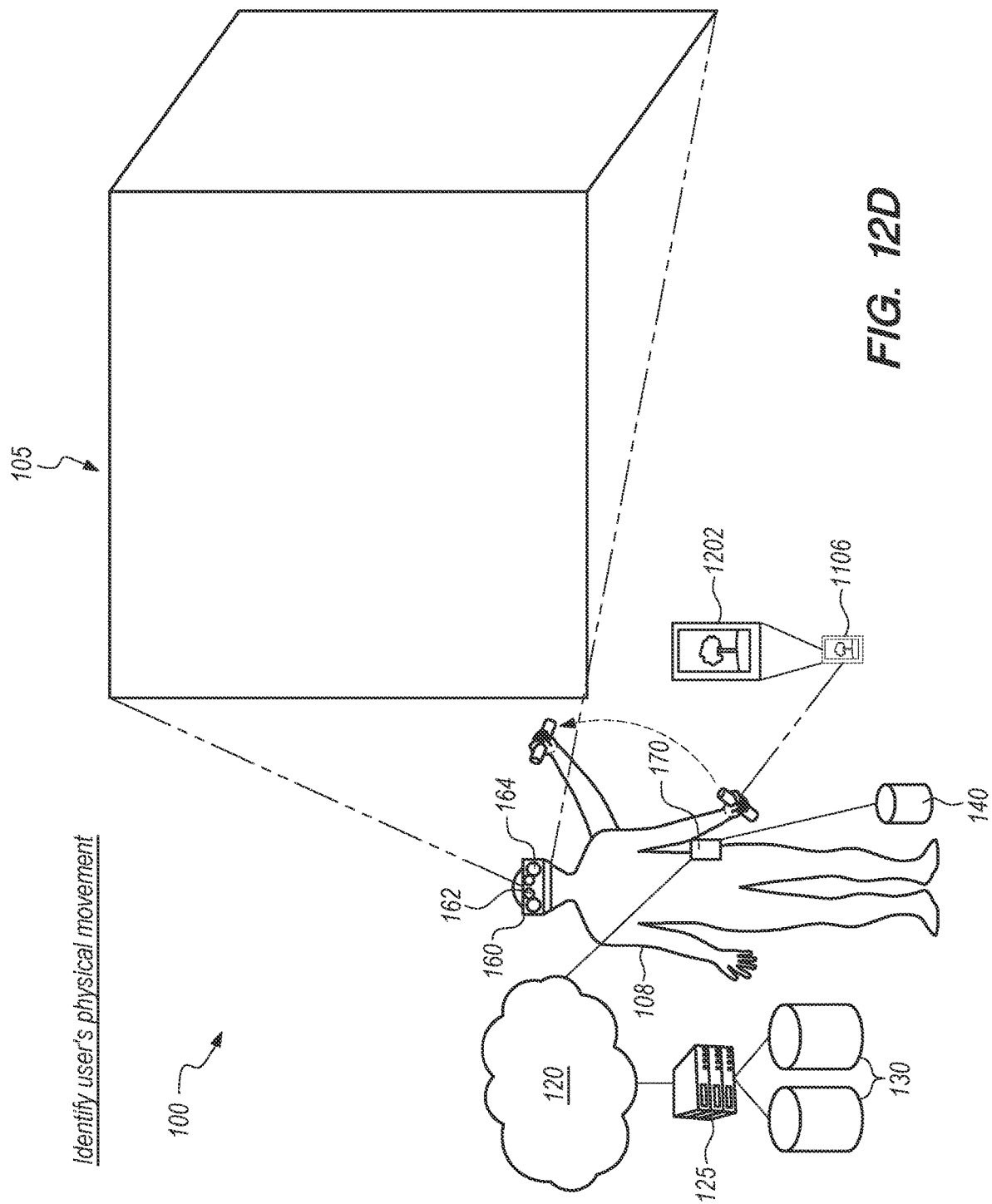
Figure 12E:
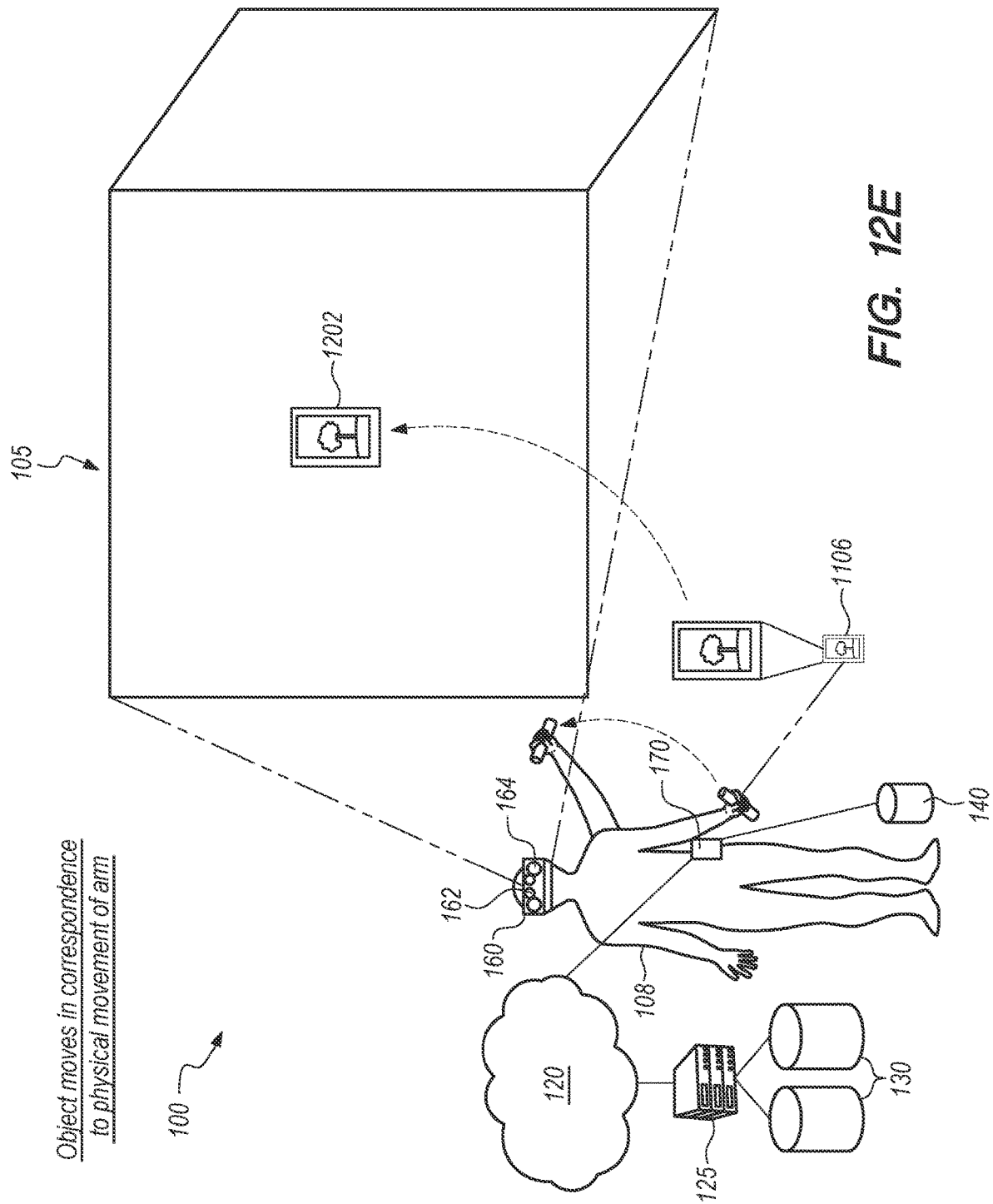

The preview 1202 may be manipulated by the user 108 in a physical manner to change the displayed location of the preview 1202. For example, while continuing to hold the totem trigger, the user can physically move a portion of his/her body, e.g., by moving the arm holding the totem to a new location/position as shown in FIG. 12D. As illustrated in FIG. 12E, the physical movement of the user's body changes the location of the preview 1202 to the corresponding wall location. This may be accomplished, for example, by detecting a change in position/orientation of the totem 1102 that is held in the moved body portion (e.g., detection of movement of the totem that is held in the user's hand), where detection of that physical movement is translated into a corresponding movement of the preview. As such, display of the new position of the preview (as well as the preview display while in motion) can be controlled by, for example, the speed of physical movement of the user, distance of physical movement, direction of physical movement, and/or any other suitable display parameters that may correspond to the physical movement. For example, a relatively small displacement in the arm position would be translated into a relatively small movement of the displayed preview, while moving the arm for a relatively larger distance would be translated to a relatively larger movement of the preview display. As another example, slower movement of the arm would be translated into a slower displayed movement of the preview while in motion, while moving the arm relatively faster would be translated to a relatively faster movement of the preview while in motion.

Figure 12F:
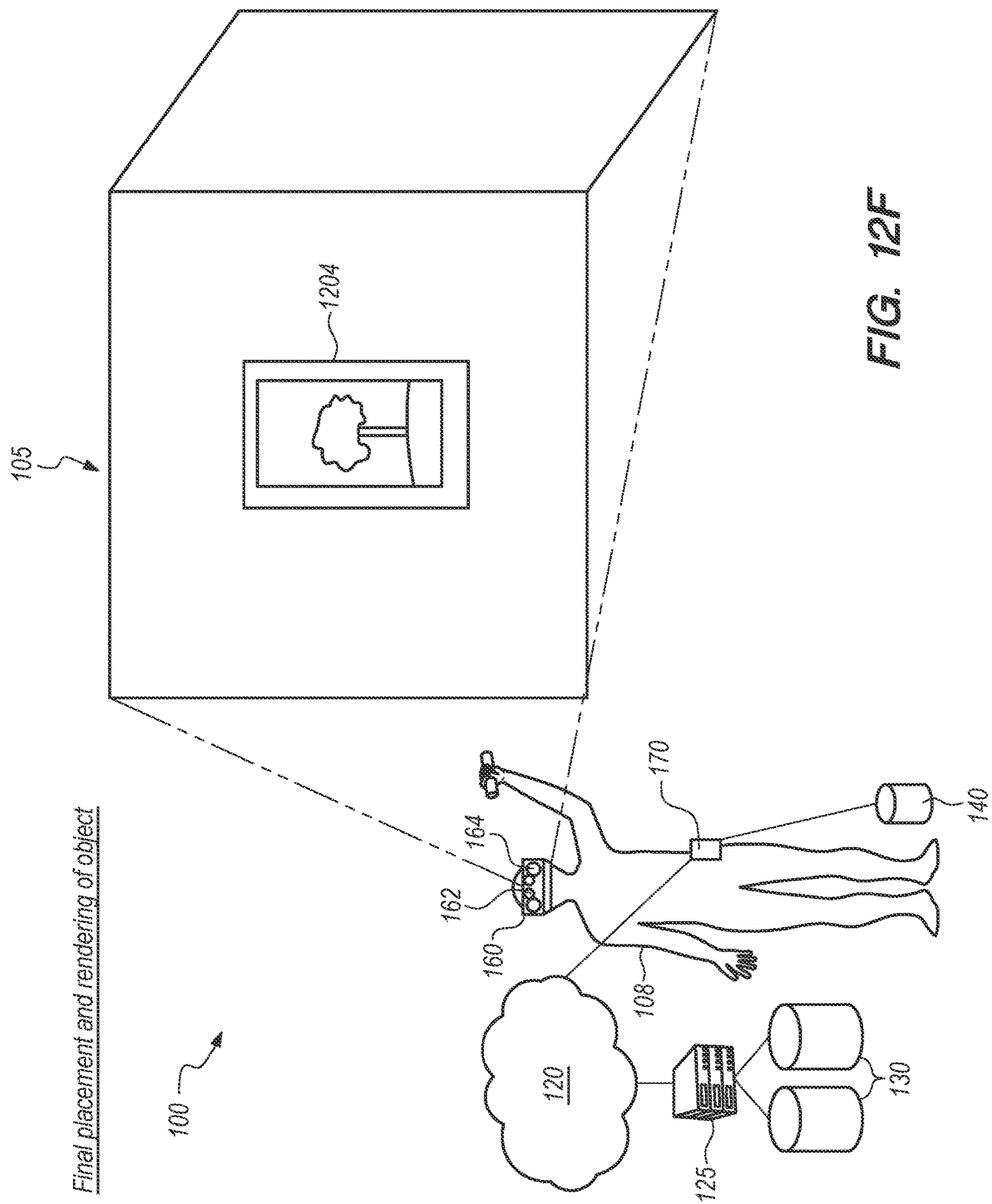

The user can then choose the location at which the wall hanging is to be placed. As illustrated in FIG. 12F, when the user releases the totem trigger, the location of the preview at the time of release of the totem trigger becomes the location of the newly created wall hanging. The full digital copy of the wall hanging from the interactable object is then retrieved and rendered for display at the selected placement location.

There are numerous benefits to this approach. For example, this physical approach to implement placement of objects allows users to spatially organize their tasks and to use their physical space to group content, establish relationships and create meaning-just like real world objects. In addition, rather than only using virtual menus and default object/window placements, physical navigation allows the user to place content manually by moving their hand, arms and body. This is a much more efficient interface as it leverages embodied physical skills instinctively familiar to most people, such as spatial memory, and gives more control to the user. This is an improvement over current technology in that, with traditional desktop and mobile browsers, new objects/windows are only created via the browser's file menu or link context menus, especially where new objects/windows are created in a default location which typically obscures the current location. In addition, computing typically requires the user to create a new digital object in one user interaction, and then place the newly created digital content with a second user interaction, whereas the improvement only requires one user interaction to do both.

ADDITIONAL EMBODIMENTS

Additional embodiments of the disclosure are described below. These additional embodiments may incorporate elements from the embodiments disclosed above, and elements of these additional embodiments may be incorporated into the embodiments disclosed above.

1. A method, comprising
   identifying an interactable object;
   identifying a physical movement of a user corresponding to the interactable object;
   determining a coordinate location for a data associated with the interactable object based upon the physical movement of the user; and
   placing the data associated with the interactable object at the coordinate location corresponding to the physical movement of the user.
2. The method of embodiment 1, wherein a user input device is employed to detect the physical movement of the user.
3. The method of embodiment 2, wherein the user input device is a haptics controller.
4. The method of embodiment 3, wherein the haptics controller corresponds to a totem device having at least six degrees of freedom.
5. The method of embodiment 3, wherein the physical movement of the user is translated into event objects at a processing system associated with the haptics controller, where the event objects correlate to data indicating movement or positioning of the haptics controller.
6. The method of embodiment 3, wherein the coordinate location for the interactable object is determined by identifying a location at which a trigger is released for the haptics controller after the physical movement of the user.
7. The method of embodiment 2, wherein the user input device is a camera to detect a user gesture.
8. The method of embodiment 1, wherein the interactable object to open is identified by identifying a link that interacts with a portion of the user's body.
9. The method of embodiment 8, wherein a preview is generated of the link by accessing content for a URL associated with the link.
10. The method of embodiment 9, wherein the physical movement of the user corresponds to a physical movement of the preview.
11. The method of embodiment 1, wherein the interactable object is both opened and placed with a single user interaction of a computing device.
12. The method of embodiment 1, wherein an orientation for the interactable object is determined by:
    determining a surface normal of the coordinate location;
    determining the orientation of the data associated with the interactable object; and
    aligning the surface normal of the coordinate location with the orientation of the data associated with the interactable object.
13. The method of embodiment 1, wherein the interactable object comprises a wall hanging.
14. A system, comprising:
    a mixed reality display device that is configured to display three dimensional content;
    a user input device configured to detect physical movement of a user;
    a processor that receives and processes data from the user input device;
    a memory for holding programmable code executable by the processor, wherein the programmable code includes instructions for identifying an interactable object, identifying a physical movement of a user corresponding to the interactable object, determining a coordinate location for a data associated with the interactable object based upon the physical movement of the user, and placing the data associated with the interactable object at the coordinate location corresponding to the physical movement of the user.
15. The system of embodiment 14, wherein the user input device is a haptics controller.
16. The system of embodiment 15, wherein the haptics controller corresponds to a totem device having at least six degrees of freedom.
17. The system of embodiment 15, wherein the physical movement of the user is translated into event objects at the processor, where the event objects correlate to the data indicating movement or positioning of the haptics controller.
18. The system of embodiment 15, wherein the coordinate location for the interactable object is determined by identifying a location at which a trigger is released for the haptics controller after the physical movement of the user.
19. The system of embodiment 14, wherein the user input device is a camera to detect a user gesture.
20. The system of embodiment 14, wherein the interactable object to open is identified by identifying a link that interacts with a portion of the user's body.
21. The system of embodiment 20, wherein a preview is generated of the link by accessing content for a URL associated with the link.
22. The system of embodiment 20, wherein the physical movement of the user corresponds to a physical movement of the preview.
23. The system of embodiment 14, wherein the interactable object comprises a wall hanging.
24. The system of embodiment 14, wherein the programmable code further includes instructions for determining an orientation for the interactable object by:
    determining a surface normal of a coordinate location;
    determining the orientation of data associated with the interactable object; and
    aligning the surface normal of the coordinate location with the orientation of the data associated with the interactable object.
25. A computer program product embodied on a computer readable medium, the computer readable medium having stored thereon a sequence of instructions which, when executed by a processor causes the processor to execute a method comprising:
    identifying an interactable object;
    identifying a physical movement of a user corresponding to the interactable object;
    determining a coordinate location for a data associated with the interactable object based upon the physical movement of the user; and
    placing the data associated with the interactable object at the coordinate location corresponding to the physical movement of the user.
26. The computer program product of embodiment 25, wherein a user input device is employed to detect the physical movement of the user corresponding to the window.
27. The computer program product of embodiment 26, wherein the user input device is a haptics controller.
28. The computer program product of embodiment 27, wherein the haptics controller corresponds to a totem device having at least six degrees of freedom.

29. The computer program product of embodiment 27, wherein the physical movement of the user is translated into event objects at a processing system associated with the haptics controller, where the event objects correlate to data indicating movement or positioning of the haptics controller.
30. The computer program product of embodiment 27, wherein the coordinate location for the interactable object is determined by identifying a location at which a trigger is released for the haptics controller after the physical movement of the user.
31. The computer program product of embodiment 26, wherein the user input device is a camera to detect a user gesture.
32. The computer program product of embodiment 25, wherein the window to open is identified by identifying a link that interacts with a portion of the user's body.
33. The computer program product of embodiment 32, wherein a preview is generated of the link by accessing content for a URL associated with the link.
34. The computer program product of embodiment 33, wherein the physical movement of the user corresponds to a physical movement of the preview.
35. The computer program product of embodiment 25, wherein the interactable object is both opened and placed with a single user interaction of a computing device.
36. The computer program product of embodiment 35, wherein the single user interaction comprises a single push of a button on the computing device.
37. The computer program product of embodiment 25, wherein the sequence of instructions further determines an orientation for the interactable object by:
   determining a surface normal of a coordinate location;
   determining the orientation of data associated with the interactable object; and
   aligning the surface normal of the coordinate location with the orientation of the data associated with the interactable object.
38. A method, comprising:
   receiving data indicating a selection of an interactable object at the start of a user interaction,
   receiving data indicating an end of the user interaction with the interactable object,
   determining a location of the interactable object at the end of the user interaction, and
   placing data associated with the interactable object at the location of the interactable object at the end of the user interaction.
39. The method of embodiment 38, further comprising a user input device providing the data indicating the selection of the interactable object and the data indicating the end of the user interaction with the interactable object.
40. The method of embodiment 39, wherein the user input device is a haptics controller.
41. The method of embodiment 40, wherein the haptics controller corresponds to a totem device having at least six degrees of freedom.
42. The method of embodiment 40, wherein a physical movement of the user is translated into event objects at a processing system associated with the haptics controller, where the event objects correlate to data for movement or positioning of the haptics controller.
43. The method of embodiment 40, wherein the location of the interactable object at the end of the user interaction is determined by identifying a location at which a trigger is released for the haptics controller after the selection of the interactable object.
44. The method of embodiment 39, wherein the user input device is a camera to detect a user gesture.
45. The method of embodiment 44, wherein the data indicating the selection of the interactable object corresponds to a selection gesture.
46. The method of embodiment 44, wherein the data indicating the end of the user interaction with the interactable object corresponds to a release gesture.
47. The method of embodiment 38, wherein the data indicating the selection of the interactable object corresponds to at least a portion of the user's body interacting with a link.
48. The method of embodiment 47, wherein a preview is generated of the link by accessing content for a URL associated with the link.
49. The method of embodiment 48, further comprising receiving data indicating a physical movement of the user, wherein the physical movement of the user corresponds to a physical movement of the preview.
50. The method of embodiment 38, wherein the interactable object is both opened and placed with the user interaction.
51. The method of embodiment 38, wherein an orientation for the interactable object is determined by:
   determining a surface normal of the location of the interactable object at the end of the user interaction;
   determining the orientation of the data associated with the interactable object; and
   aligning the surface normal of the coordinate location with the orientation of the data associated with the interactable object.
52. The method of embodiment 39, wherein the interactable object comprises a wall hanging.
53. A method, comprising:
   receiving data indicating a selection of an interactable object at the start of a user interaction,
   receiving data indicating an end of the user interaction with the interactable object,
   determining a location of the interactable object at the end of the user interaction, and
   creating a new prism for the data associated with the interactable object at the end of the user interaction when the location of the interactable object at the end of the user interaction is outside of an initial prism of the interactable object.
54. The method of embodiment 53, further comprising displaying a visual preview of the data associated with the interactable object at the location of the interactable object between the start and the end of the user interaction when the interactable object is located outside the bounds of the initial prism.
55. The method of embodiment 53, further comprising a user input device providing the data indicating the selection of the interactable object and the data indicating the end of the user interaction with the interactable object.
56. The method of embodiment 55, wherein the user input device is a haptics controller.
57. The method of embodiment 56, wherein the haptics controller corresponds to a totem device having at least six degrees of freedom.
58. The method of embodiment 56, wherein a physical movement of the user is translated into event objects at a processing system associated with the haptics con- 59. The method of embodiment 56, wherein the location of the interactable object at the end of the user interaction is determined by identifying a location at which a trigger is released for the haptics controller after the selection of the interactable object.
60. The method of embodiment 55, wherein the user input device is a camera to detect a user gesture.
61. The method of embodiment 60, wherein the data indicating the selection of the interactable object corresponds to a selection gesture.
62. The method of embodiment 60, wherein the data indicating the end of the user interaction with the interactable object corresponds to a release gesture.
63. The method of embodiment 53, wherein the data indicating the selection of the interactable object corresponds to at least a portion of the user's body interacting with a link.
64. The method of embodiment 63, wherein a preview is generated of the link by accessing content for a URL associated with the link.
65. The method of embodiment 64, further comprising receiving data indicating a physical movement of the user, wherein the physical movement of the user corresponds to a physical movement of the preview.
66. The method of embodiment 53, wherein the interactable object is both opened and placed with the user interaction.
67. The method of embodiment 53, wherein an orientation for the interactable object is determined by:
   determining a surface normal of the location of the interactable object at the end of the user interaction;
   determining the orientation of the data associated with the interactable object; and
   aligning the surface normal of the coordinate location with the orientation of the data associated with the interactable object.
68. The method of embodiment 53, wherein the interactable object comprises a wall hanging.
69. A method, comprising:
   receiving data indicating the selection of an interactable object contained within a first prism at the start of a user interaction, and
   creating a second prism at a location of the interactable object at an end of the user interaction to contain the data associated with the interactable object when data representing a physical movement of the user corresponding to the user interaction between the start and the end of the user interaction indicates the interactable object is outside of the first prism at the end of the user interaction.
70. The method of embodiment 69, further comprising a user input device providing the data indicating the selection of the interactable object and the data indicating representing a physical movement of the user corresponding to the user interaction between the start and the end of the user.
71. The method of embodiment 70, wherein the user input device is a haptics controller.
72. The method of embodiment 71, wherein the haptics controller corresponds to a totem device having at least six degrees of freedom.
73. The method of embodiment 71, wherein a physical movement of the user is translated into event objects at a processing system associated with the haptics controller, where the event objects correlate to data for movement or positioning of the haptics controller.
74. The method of embodiment 71, wherein the location of the interactable object at the end of the user interaction is determined by identifying a location at which a trigger is released for the haptics controller after the selection of the interactable object.
75. The method of embodiment 70, wherein the user input device is a camera to detect a user gesture.
76. The method of embodiment 75, wherein the data indicating the selection of the interactable object corresponds to a selection gesture.
77. The method of embodiment 75, wherein the data indicating the end of the user interaction with the interactable object corresponds to a release gesture.
78. The method of embodiment 69, wherein the data indicating the selection of the interactable object corresponds to at least a portion of the user's body interacting with a link.
79. The method of embodiment 78, wherein a preview is generated of the link by accessing content for a URL associated with the link.
80. The method of embodiment 79, wherein the physical movement of the user corresponds to a physical movement of the preview.
81. The method of embodiment 69, wherein the interactable object is both opened and placed with the user interaction.
82. The method of embodiment 69, wherein an orientation for the interactable object is determined by:
   determining a surface normal of the location of the interactable object at the end of the user interaction;
   determining the orientation of the data associated with the interactable object; and
   aligning the surface normal of the coordinate location with the orientation of the data associated with the interactable object.
83. The method of embodiment 69, wherein the interactable object comprises a wall hanging.
84. A system, comprising:
   a mixed reality display device that is configured to display three dimensional content;
   a user input device configured to detect physical movement of a user;
   a processor that receives and processes data from the user input device;
   a memory for holding programmable code executable by the processor, wherein the programmable code includes instructions for receiving data indicating a selection of an interactable object contained within a first prism at the start of a user interaction, receiving data indicating an end of the user interaction with the interactable object, receiving data indicating a physical movement of the user corresponding to removing the interactable object from the first prism between the start and the end of the user interaction, and creating a second prism to contain the data associated with the interactable object at the end of the user interaction with the interactable object.
85. A system, comprising:
   a mixed reality display device that is configured to display three dimensional content;
   a user input device configured to detect physical movement of a user;
   a processor that receives and processes data from the user input device;

a memory for holding programmable code executable by the processor, wherein the programmable code includes instructions for receiving data indicating a selection of an interactable object at the start of a user interaction, receiving data indicating an end of the user interaction with the interactable object, determining a location of the interactable object at the end of the user interaction, and creating a new prism for the data associated with the interactable object at the end of the user interaction when the location of the interactable object at the end of the user interaction is outside of an initial prism of the interactable object 86. A system, comprising:
a mixed reality display device that is configured to display three dimensional content;
a user input device configured to detect physical movement of a user;
a processor that receives and processes data from the user input device;
a memory for holding programmable code executable by the processor, wherein the programmable code includes instructions for receiving data indicating the selection of an interactable object contained within a first prism at the start of a user interaction, and creating a second prism at a location of the interactable object at an end of the user interaction to contain the data associated with the interactable object when data representing a physical movement of the user corresponding to the user interaction between the start and the end of the user interaction indicates the interactable object is outside of the first prism at the end of the user interaction.

System Architecture Overview

Figure 13:
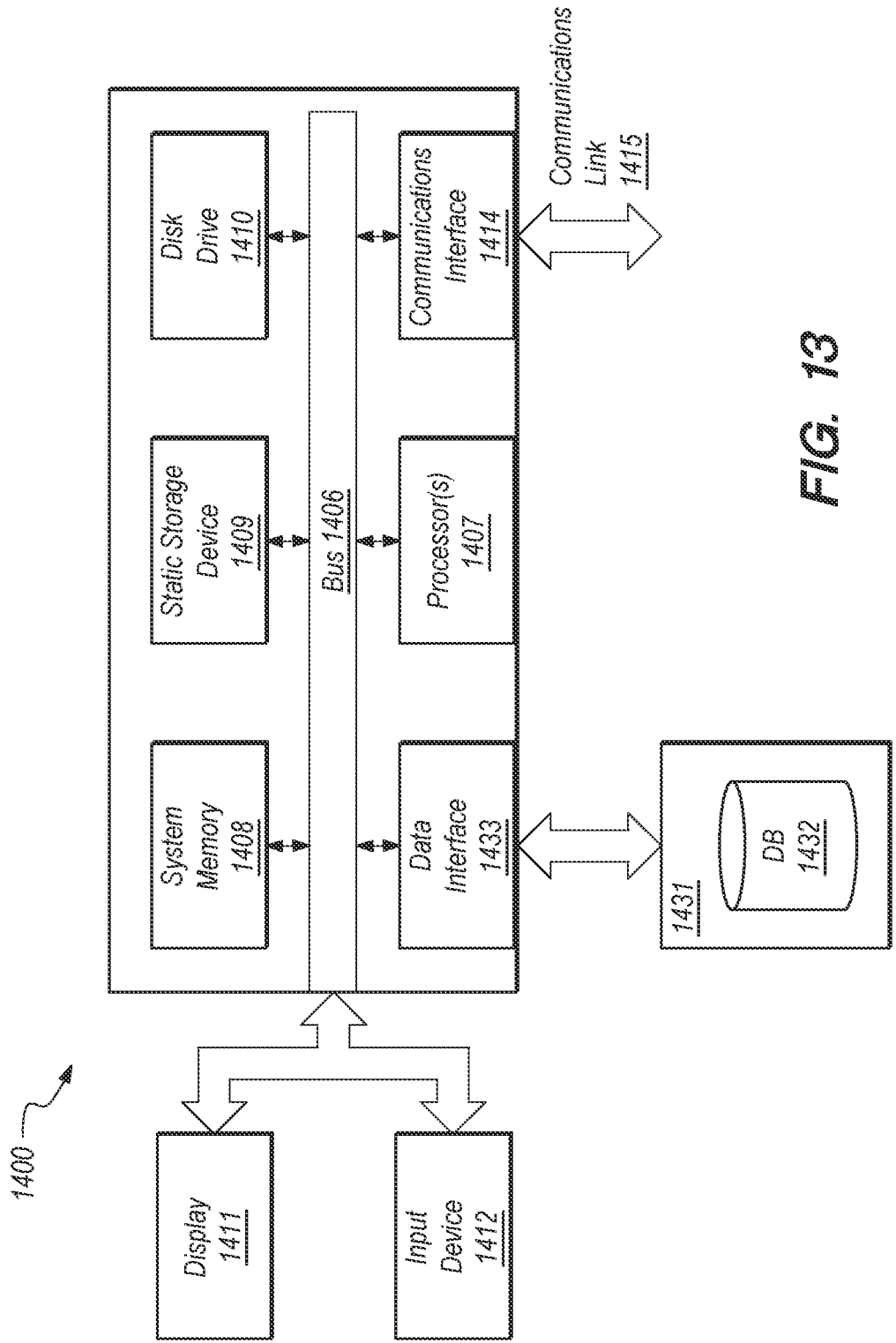
FIG. 13 is a block diagram of an illustrative computing system suitable for implementing an embodiment of the present disclosure.

FIG. 13 is a block diagram of an illustrative computing system 1400 suitable for implementing an embodiment of the present disclosure. The computing system 1400 includes a bus 1406 or other communication mechanism for communicating information, which interconnects subsystems and devices, such as a processor 1407, system memory 1408 (e.g., RAM), a static storage device 1409 (e.g., ROM), a disk drive 1410 (e.g., magnetic or optical), a communications interface 1414 (e.g., modem or Ethernet card), a display 1411 (e.g., CRT or LCD), an input device 1412 (e.g., keyboard and mouse).

According to one embodiment of the invention, the computing system 1400 performs specific operations by the processor 1407 executing one or more sequences of one or more instructions contained in the system memory 1408. Such instructions may be read into the system memory 1408 from another computer readable/usable medium, such as the static storage device 1409 or the disk drive 1410. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to the processor 1407 for execution. Such a medium may take many forms, including but not limited to, non-volatile media and volatile media. Non-volatile media includes, for example, optical or magnetic disks, such as the disk drive 1410. Volatile media includes dynamic memory, such as the system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computing system 1400. According to other embodiments of the disclosure, two or more computing systems 1400 coupled by a communications link 1415 (e.g., LAN, PTSN, or wireless network) may perform the sequence of instructions required to practice the disclosure in coordination with one another.

The computing system 1400 may transmit and receive messages, data, and instructions, including program (i.e., application code) through the communications link 1415 and the communications interface 1414. Received program code may be executed by the processor 1407 as it is received, and/or stored in the disk drive 1410, or other non-volatile storage for later execution. The computing system 1400 may communicate through a data interface 1433 to a database 1432 on an external storage device 1431.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A system, comprising:
a mixed reality display device configured for displaying an interactable object as virtual content at a first location within a spatially organized three-dimensional environment to a user;
a user interface configured for detecting interaction of the user with the interactable object; and
a processor configured for:
receiving data indicating a selection of the interactable object contained within a first prism at a start of a user interaction, wherein the data indicating the selection of the interactable object corresponds to at least a portion of a body of the user interacting with a link;
generating a preview of the link by accessing content for a Uniform Resource Locator (URL) associated with the link;
instructing the mixed reality display device to display the preview including at least a portion of the content for the URL associated with the link;
receiving data indicating an end of the user interaction with the interactable object;
receiving data indicating a physical movement of the user corresponding to removing the interactable object from the first prism between the start and the end of the user interaction, wherein the physical movement of the user corresponds to a movement of the preview such that visual display of the preview moves during the user interaction according to the physical movement; and creating a second prism to contain the interactable object at the end of the user interaction with the interactable object, wherein the three-dimensional environment includes a deconstructed two-dimensional web page.

2. The system of claim 1, wherein the processor is also configured for instructing the mixed reality display device to display the preview at a location of the interactable object between the start and the end of the user interaction when the interactable object is located outside of bounds of the first prism.

3. The system of claim 1, further comprising a user input device configured to provide the data indicating the selection of the interactable object and the data indicating the end of the user interaction with the interactable object.

4. The system of claim 3, wherein the user input device is a haptics controller.

5. The system of claim 4, wherein the haptics controller is a totem device having at least six degrees of freedom.

6. The system of claim 4, further comprising a processing system associated with the haptics controller, wherein the processing system is configured to translate the physical movement of the user into event objects, and wherein the event objects correlate to data for movement or positioning of the haptics controller.

7. The system of claim 4, wherein the haptics controller comprises a trigger, and wherein a location of the interactable object at the end of the user interaction is determined by identifying a location at which the trigger is released after the selection of the interactable object.

8. The system of claim 3, wherein the user input device is a camera to detect a user gesture.

9. The system of claim 8, wherein the data indicating the selection of the interactable object corresponds to a selection gesture.

10. The system of claim 8, wherein the data indicating the end of the user interaction with the interactable object corresponds to a release gesture.

11. The system of claim 1, wherein the interactable object is both opened and placed with the user interaction.

12. The system of claim 1, wherein the processor is also configured for determining an orientation for the interactable object by:

determining a surface normal of a location of the interactable object at the end of the user interaction;

determining an orientation data of the interactable object; and aligning the surface normal of the location with the orientation data of the interactable object.

13. The system of claim 1, wherein the interactable object comprises a wall hanging.

14. A system, comprising:

a mixed reality display device configured for displaying an interactable object as virtual content at a first location within a spatially organized three-dimensional environment to a user;

a user interface configured for detecting interaction of the user with the interactable object; and a processor configured for:

receiving data indicating a selection of the interactable object at a start of a user interaction, wherein the data indicating the selection of the interactable object corresponds to at least a portion of a body of the user interacting with a link;

generating a preview of the link by accessing content for a Uniform Resource Locator (URL) associated with the link;

displaying the preview including at least a portion of the content for the URL associated with the link;

receiving data indicating an end of the user interaction with the interactable object;

determining a location of the interactable object at the end of the user interaction;

receiving data indicating a physical movement of the user, wherein the physical movement of the user corresponds to a movement of the preview such that visual display of the preview moves during the user interaction according to the physical movement; and creating a new prism for the interactable object at the end of the user interaction when the location of the interactable object at the end of the user interaction is outside of an initial prism of the interactable object, wherein the three-dimensional environment includes a deconstructed two-dimensional web page.

15. The system of claim 14, further comprising a user input device configured to provide the data indicating the selection of the interactable object and the data indicating the end of the user interaction with the interactable object.

16. The system of claim 15, wherein the user input device is a haptics controller.

17. The system of claim 16, further comprising a processing system associated with the haptics controller, wherein the processing system is configured to translate the physical movement of the user into event objects, and wherein the event objects correlate to data for movement or positioning of the haptics controller.

18. A system, comprising:

a mixed reality display device configured for displaying an interactable object as virtual content at a first location within a spatially organized three-dimensional environment to a user;

a user interface configured for detecting interaction of the user with the interactable object; and a processor configured for:

receiving data indicating the selection of the interactable object contained within a first prism at a start of a user interaction, wherein the data indicating the selection of the interactable object corresponds to at least a portion of a body of the user interacting with a link;

generating a preview of the link by accessing content for a Uniform Resource Locator (URL) associated with the link;

displaying the preview including at least a portion of the content for the URL associated with the link;

receiving data indicating a physical movement of the user, wherein the physical movement of the user corresponds to a movement of the preview such that visual display of the preview moves during the user interaction according to the physical movement; and creating a second prism at a location of the interactable object at an end of the user interaction to contain the interactable object when the data indicating the physical movement of the user indicates that the interactable object is outside of the first prism at the end of the user interaction, wherein the processor is further configured to deconstruct a two-dimensional web page and to have the deconstructed two-dimensional web page displayed in the three-dimensional environment.

19. The system of claim 18, further comprising a user input device configured to provide the data indicating the selection of the interactable object and the data indicating the end of the user interaction with the interactable object, wherein the user input device is a haptics controller.

20. The system of claim 19, further comprising a processing system associated with the haptics controller,
wherein the processing system is configured to translate the physical movement of the user into event objects, and
wherein the event objects correlate to data for movement or positioning of the haptics controller.

* * * * *